(12) United States Patent
Igarashi

(10) Patent No.: US 9,442,494 B2
(45) Date of Patent: Sep. 13, 2016

(54) COSMETIC BLENDING MACHINE FOR FOUNDATION, CONCEALER, TINTED MOISTURIZER, PRIMER, SKIN CARE PRODUCTS, NAIL POLISH, BLUSH, HAIR DYE, LIPSTICK AND OTHER PRODUCTS

(71) Applicant: L'Oreal, Paris (FR)

(72) Inventor: Larry Y. Igarashi, Coto De Caza, CA (US)

(73) Assignee: L'Oreal, Paris (FR)

( * ) Notice: Subject to any disclaimer, the term of this patent is extended or adjusted under 35 U.S.C. 154(b) by 0 days.

(21) Appl. No.: 14/645,243

(22) Filed: Mar. 11, 2015

(65) Prior Publication Data

US 2015/0253782 A1 Sep. 10, 2015

Related U.S. Application Data

(63) Continuation of application No. 14/254,284, filed on Apr. 16, 2014, now Pat. No. 9,007,588, which is a continuation-in-part of application No. 14/085,652, filed on Nov. 20, 2013, now Pat. No. 8,830,468, which (Continued)

(51) Int. Cl.
*G01J 3/46* (2006.01)
*G05D 7/06* (2006.01)
(Continued)

(52) U.S. Cl.
CPC ........... *G05D 7/0617* (2013.01); *A45D 44/005* (2013.01); *B01F 11/0094* (2013.01); *B01F 13/1063* (2013.01); *B01F 15/00175* (2013.01); *B01F 15/00214* (2013.01);
(Continued)

(58) Field of Classification Search
CPC ................ G01J 3/02; G01J 3/46; G01J 3/50; G01J 3/51; G01J 3/524; G05D 7/0617; A45D 44/005
USPC .................................................. 356/402–425
See application file for complete search history.

(56) References Cited

U.S. PATENT DOCUMENTS 5,622,692 A 4/1997 Rigg
5,903,465 A 5/1999 Brown
(Continued)

FOREIGN PATENT DOCUMENTS

CA 2 400 748 A1 10/2001
CA 2 461 307 A1 4/2003
(Continued)

*Primary Examiner* — Abdullahi Nur
(74) *Attorney, Agent, or Firm* — Christensen O'Connor Johnson Kindness PLLC

(57) ABSTRACT

A colorimeter, webcam, camera, spectrophotometer, scanner or other instrument measures the color composition and conditions and texture of a person's body part or presented beauty product and an individual custom formulation is produced. A presented beauty product may include foundation, concealer, tinted moisturizer, primer, skin care products, blush, nail polish, hair dye, lipstick, lip gloss, mascara, eye liner and eye shadow. The produced custom formulation may comprise foundation, concealer, tinted moisturizer, primer, skin care products, blush, nail polish, hair dye, lipstick, lip gloss, mascara, eye liner, eye shadow or other consumer products. A computer system 301 includes a processor 501 and a non-transitory, computer readable medium 500 containing machine readable instructions that accept data from a colorimeter 300 or like instrument and uses a main executable program 502 and a subroutine 504 for color analysis.

24 Claims, 12 Drawing Sheets

Related U.S. Application Data is a continuation-in-part of application No. 13/896,557, filed on May 17, 2013, now Pat. No. 8,593,634, which is a continuation-in-part of application No. 13/621,732, filed on Sep. 17, 2012, now Pat. No. 8,564,778, which is a continuation-in-part of application No. 13/523,892, filed on Jun. 15, 2012, now abandoned.

(60) Provisional application No. 61/527,283, filed on Aug. 25, 2011.

(51) Int. Cl.

| | | |
|---|---|---|
| *G05D 11/13* | (2006.01) | |
| *A45D 44/00* | (2006.01) | |
| *B01F 11/00* | (2006.01) | |
| *B01F 13/10* | (2006.01) | |
| *B01F 15/00* | (2006.01) | |
| *B01F 15/02* | (2006.01) | |
| *G05B 15/02* | (2006.01) | |

(52) U.S. Cl.
CPC .... *B01F 15/00253* (2013.01); *B01F 15/0245* (2013.01); *G01J 3/46* (2013.01); *G05B 15/02* (2013.01); *G05D 11/132* (2013.01); *A45D 2044/007* (2013.01); *A45D 2200/058* (2013.01); *B01F 2215/0031* (2013.01); *Y10T 137/0329* (2015.04); *Y10T 137/86027* (2015.04)

(56) References Cited

U.S. PATENT DOCUMENTS

| | | | |
|---|---|---|---|
| 5,945,112 A | 8/1999 | Flynn | |
| 6,177,093 B1 | 1/2001 | Lombardi | |
| 6,284,228 B1 | 9/2001 | Markowitz | |
| 6,412,658 B1 | 7/2002 | Bartholomew | |
| D461,080 S | 8/2002 | Bartholomew | |
| 6,437,866 B1 | 8/2002 | Flynn | |
| D465,810 S | 11/2002 | Bartholomew | |
| 6,510,366 B1 | 1/2003 | Murray | |
| 6,603,550 B1 | 8/2003 | Flynn | |
| 6,615,881 B2 | 9/2003 | Bartholomew | |
| 6,622,064 B2 | 9/2003 | Bartholomew | |
| D485,310 S | 1/2004 | Bartholomew | |
| 6,672,341 B2 | 1/2004 | Bartholomew | |
| 6,779,686 B2 | 8/2004 | Bartholomew | |
| D500,804 S | 1/2005 | Bartholomew | |
| 6,883,561 B2 | 4/2005 | Bartholomew | |
| 6,935,386 B2 | 8/2005 | Miller | |
| D513,040 S | 12/2005 | Bartholomew | |
| 7,082,970 B2 | 8/2006 | Bartholomew | |
| 7,090,740 B2 | 8/2006 | Dronzek | |
| 7,121,429 B2 | 10/2006 | Bartholomew | |
| 7,174,310 B2 | 2/2007 | Bartholomew | |
| 7,206,664 B2 | 4/2007 | Schmid | |
| 7,395,134 B2 | 7/2008 | Bartholomew | |
| 7,445,372 B1 | 11/2008 | Engel | |
| 7,475,710 B2 | 1/2009 | Bartholomew | |
| 7,624,769 B2 | 12/2009 | Bartholomew | |
| 7,822,504 B2 | 10/2010 | Bartholomew | |
| 8,017,137 B2 | 9/2011 | Bartholomew | |
| 8,141,596 B2 | 3/2012 | Bartholomew | |
| 8,186,872 B2 | 5/2012 | Bartholomew | |
| 8,351,038 B2 | 1/2013 | Carroll | |
| 8,352,070 B2 | 1/2013 | Bartholomew | |
| 8,573,263 B2 | 11/2013 | Bartholomew | |
| 8,608,371 B2 | 12/2013 | Bartholomew | |
| 8,636,173 B2 | 1/2014 | Bartholomew | |
| 8,830,467 B2 | 9/2014 | Igarashi | |
| 8,880,218 B2 | 11/2014 | Bartholomew | |
| 9,007,588 B1* | 4/2015 | Igarashi | 356/402 |
| 2002/0179639 A1 | 12/2002 | Bartholomew | |
| 2003/0090176 A1 | 5/2003 | Bartholomew | |
| 2009/0210322 A1 | 8/2009 | Stark | |
| 2014/0094964 A1 | 4/2014 | Bartholomew | |
| 2014/0311625 A1 | 10/2014 | Bartholomew | |

FOREIGN PATENT DOCUMENTS

| | | |
|---|---|---|
| CA | 2 574 486 A1 | 2/2006 |
| CA | 2 587 098 A1 | 5/2006 |
| EP | 1 297 409 A1 | 4/2003 |
| EP | 1 429 640 | 4/2003 |
| EP | 1 834 309 A1 | 9/2007 |
| EP | 2 000 089 A1 | 12/2008 |
| HK | 1069746 A1 | 10/2007 |
| HK | 1117623 A1 | 8/2013 |
| JP | 4231407 B2 | 2/2009 |
| JP | 4699473 B2 | 6/2011 |
| JP | 5196695 B2 | 5/2013 |
| JP | 5514289 B2 | 6/2014 |
| WO | 03/026458 A2 | 4/2003 |
| WO | 2006/052863 A1 | 5/2006 |
| WO | 2001/075586 A1 | 10/2011 |
| WO | 2014/006721 A2 | 5/2014 |

* cited by examiner

Fig. 12   Custom Cosmetic Blending Machine and System

COSMETIC BLENDING MACHINE FOR FOUNDATION, CONCEALER, TINTED MOISTURIZER, PRIMER, SKIN CARE PRODUCTS, NAIL POLISH, BLUSH, HAIR DYE, LIPSTICK AND OTHER PRODUCTS

CROSS-REFERENCES TO RELATED APPLICATIONS

This application is a continuation of U.S. application Ser. No. 14/254,284, filed Apr. 16, 2014, which is a continuation in part of U.S. application Ser. No. 14/085,652, filed Nov. 20, 2013, now U.S. Pat. No. 8,830,468, which is a continuation in part of U.S. application Ser. No. 13/896,557, filed May 17, 2013, now U.S. Pat. No. 8,593,634, which is a continuation in part of U.S. application Ser. No. 13/621,732, filed Sep. 17, 2012, now U.S. Pat. No. 8,564,778, which is a continuation in part of U.S. application Ser. No. 13/523,892, filed Jun. 15, 2012, which claims the benefit of U.S. Provisional Patent Application No. 61/527,283, filed Aug. 25, 2011, the disclosures of which are hereby expressly incorporated by reference in their entirety.

BACKGROUND OF THE INVENTION (1) Field of the Invention

The invention generally relates to custom cosmetic coloring systems. More particularly, the invention relates to means and methods of creating custom cosmetic products having colors matched to a consumer's individual body part or presented beauty product by custom skin color analysis, handheld colorimeters, optical device such as webcam, camera, scanner, color interpolation, color blending, dispensing machines and client data network utilization.

(2) Description of the Related Art

Today's cosmetic markets produce and sell just a small subset of available colors. The known related art fails to anticipate or disclose the principles of the present invention.

In the related art, a past company called Prescriptives, which is now owned by Estee Lauder, used a "Hand Making" custom blending foundation. This service is no longer offered. The past Hand Making service comprised the creating of a wide range of colors beyond that of their standard on the shelf stock color foundations. The mixed colors were printed upon a color chart, and the color chart was placed next to a woman's face to find the closest color match. This process is similar to what women now do to find the closest color of stock items. The creation of a color was made with a white base container with a pump as well as other pigment containers with pumps. A pigment ratio chart was used to make the selected color; pigments were pumped according to the ratio chart. The final mixture was mixed and shaken by hand. Prescriptives used #1 to #7 range of light to dark pre-mixed white bases.

Due to human hand mixing with eyeball judgment, Prescriptives' operators had to make several attempts to obtain a suitable color match. Such a trial and error method resulted in tremendous of material and customer goodwill. As each color matching attempt would consume 30 to 45 minutes customers became disenchanted with the prior art.

In a somewhat related field, paint dispensers may be found in retail establishments such as Home Depot, Lowe's and Dunn Edwards paint stores. Customers in such stores select a color from a color fan deck. A store worker enters the color number into a machine and pigment dispensers drop pigment into a waiting container of white paint base. The container lid is then closed and a machine vigorously mixes the paint. Some stores have pre-equipped stationary scanner where customer's desired color sample is held up under, and the scanner finds the closest color to match. Paint industry use larger quantity of paint base and pigments like quart to 5 gallon units.

U.S. Pat. No. 5,622,692 by Rigg granted on Apr. 22, 1997 discloses a system storing a finite number of pre-fabricated skin color formulas and a mapping function wherein each customer is assigned a pre-fabricated formula that is a "best fit" to the customer. The '692 patent fails to recognize that every individual has unique skin color components. Today's discerning consumers eschew the cookie cutter approach of the '692 patent.

U.S. Pat. No. 5,785,960 by Rigg granted on Jul. 28, 1998 discloses methods and general purpose computer machinery to remotely store and transmit customer color information. The "telemodem program" and other components of the '960 patent are no longer relevant with the advent of on-site color analysis.

U.S. Pat. No. 5,903,465 by Brown granted on May 11, 1999 purports to disclose "means" of obtaining a customer's undefined "optimal formula." The '465 patent contains an excellent wish list of features but fails to disclose sufficient detail to allow one reasonable skilled in the art to make a color system.

U.S. Pat. No. 5,945,112 by Flynn granted on Aug. 31, 1999 discloses methods of adjusting red, yellow and white color components in a effort to reduce the visual hardship of viewing acne, rosacea and other skin anomalies. The '112 patent attempts to obtain a modified color formula that does not naturally exist upon the patient. The '112 system leads to unnatural color applications.

U.S. Pat. No. 6,437,866 B1 by Flynn granted on Aug. 20, 2002 discloses an indirect method of matching color by measuring skin color, using a computer program and screen to display the measured skin color in comparison to the customer's face. Flynn then presents various pre-mixed cosmetics for selection by the customer. While Flynn may artfully present pre-made or off the shelve cosmetics to a consumer, Flynn fails to mention or anticipate means or methods to create custom products matching the skin tones of a customer.

U.S. Pat. No. 6,510,366 by Murray granted on Jan. 21, 2003 discloses a mechanically complex pump system used to dispense cosmetics. The pump of the '366 patent features an internal piston system with a pivot that facilitates reciprocating and rotation motions. The pump of the '366 patent is expensive to construct and difficult to maintain due to the number and complexity of its moving parts. Moreover, the '366 pump needs complete cleaning after each use.

U.S. Pat. No. 6,603,550 B1 by Flynn et al granted on Aug. 5, 2003 discloses a handheld skin color measuring device attached to a computer. The system measures a customer's skin color and then recommends pre-existing products having similar colors. The '550 patent eschews custom color manufacturing as being too expensive and time consuming. Thus, there is room in the art for efficient, accurate, quick and economical means of customer color analysis and means of custom color product production.

U.S. patent application 2002/0179639 A1 by Bartholomew et al published on Dec. 5, 2002 discloses an interactive custom cosmetic powder color and effects dispensing system. But, Bartholomew fails to disclose or consider non-powder applications and fails to disclose liquid applications, such as those presented in the present application. Moreover, Bartholomew fails to disclose just how colors are blended or how colors are targeted for blending.

U.S. patent application 2003/0090176 A1 by Bartholomew et al published on May 15, 2003 attempts to disclose a system for cosmetics point of sale display and cosmetics dispensing. Here again, actual means of color capture and/or color production of liquids are not disclosed.

U.S. patent application 2009/0210322 A1 by Stark published on Aug. 20, 2009 merely discloses a mental process of mixing elements, shaking, applying the compound to the customer, waiting five minutes and looking at the color. Stark fails to disclose any enabling means of automatically matching products to customer skin color. Moreover, Stark fails to disclose, suggest or anticipate means of dealing with non-powder ingredients.

U.S. Pat. No. 6,177,093 B1 by Lombardi et al granted on Jan. 23, 2001 and U.S. Pat. No. 6,284,228 B1 by Markowitz et al granted on Sep. 4, 2001 disclose color blending by use of pellets of colors but fail to disclose or suggest means or methods of creating true custom colors by use of dynamic quantity control of color elements. The use of pellets presents a short fall in the art as color creation is limited in increments equal to the size of the pellets. There is no way to create colors that occur between pellet sizes.

A system sometimes called Microskin™ comprises material applied to skin to cover skin blemishes. The color of the material may be based upon a scan of the consumer's skin. But, Microskin™ fails to disclose means or methods of applying makeup or deriving makeup color.

BRIEF SUMMARY OF THE INVENTION

The present invention overcomes shortfalls in the related art by presenting an unobvious and unique combination and configuration of methods and components to seamlessly match a customer's facial color, body part color or presented beauty product with a cosmetic color. Embodiments of the invention include custom blending for foundations, tinted moisturizer, concealers, primers, powder, blushes, shimmers, lipstick, lip gloss, eye shadows, hair dyes, nail polish, skin care products, mascara, eye liner and other products in very minuscule volume such as a quarter of an ounce to 1 ounce unit with extreme accuracy of bases, blenders/pigments, thinner, moisturizer and additives measured and dispensed in micro milliliter to milliliter units.

The invention overcomes shortfalls in the related art by using various devices such as spectrophotometers, colorimeters, cameras, or webcams to measure color texture and other attributes upon a target surface which may comprise skin, hair, nails, body part color and/or a presented beauty product and to report precise percentages of all relevant color components or light frequencies using disclosed embodiments. For added accuracy, two or three separate locations upon a customer's target surface may be measured in order to derive a best average. Accuracy is further enhanced by using lighting from light frequencies approximating natural day light. However, excellent results have been obtained by taking readings from just one area of a customer's target surface. The disclosed systems are refined enough to achieve unexpectedly good results from readings obtained from just one point of reference. Excellent results are also obtained by taking three or so readings to derive a best average.

Embodiments of the present invention overcome shortfalls in the art by discovery of an unobvious combination and use of medical peristaltic pumps, tapered nozzle needles, triangle nozzle needles, canister caps with agitator rods and end plates and other components that provide unexpected results. Some embodiments do not use an agitator. Some embodiments use tapered nozzle needles. Some embodiments use bent nozzle needles to help control the flow of material.

Embodiments of the present invention overcome shortfalls in the art by use of color chat cameras used in combination with live help sessions wherein operators of a disclosed system communicate in real time with consumers. Thus, consumers may have their target areas scanned remotely during live consultations wherein consumers are instructed as to proper lighting and body positioning to obtain a correct color scan. Embodiments of color chat cameras are sometimes known as webcams and similar devices. The disclosed use of webcams allows operators of the system to provide real time instructions to consumers so that consumers will present their target areas to the webcams in the best possible light, focus and angle. On the system side, an operator may adjust webcam images to more accurately obtain a true color sample. The webcam embodiments also work well in a retail or store setting wherein a customer will sit in front of a webcam and receive face to face instructions from a worker in the retail store. In addition to webcams, smart phones and similar devices may be used to obtain target area information such as body part color and texture information.

Disclosed embodiments overcome other shortfalls in the art by allowing a consumer to obtain a color match and/or product match of a presented beauty product. A "beauty product" may be a product selected from the group comprising foundation, concealer, tinted moisturizer, primer, skin care products, nail polish, blush, hair dye, lipstick, lip gloss, mascara, eye liner, eye shadow and other beauty or cosmetic products. A consumer may present a beauty product as a target area to be viewed by the system. The system then produces the desired product in the desired color. A disclosed system may include a plurality of databases mapped to the plurality of beauty products. For example, a disclosed system may comprise a database of nail polish color, a database of hair dye color, a database of lipstick color, a database of lip gloss color, a database of mascara color, a database of mascara color, a database of eyeliner color, a database of skin care products, a database of eye shadow color and a plurality of other databases.

In the prior art, liquid cosmetic products such as foundation, concealer, primer, tinted moisturizer, and the like are riddled with air holes trapped within thick viscosity and typically clog dispensing nozzles. Prior art dispensing machines for liquid cosmetic products fail to control the starting and stopping of product dispensed from nozzles.

Embodiments of the disclosed mixing and dispensing system fulfill a long felt need in the art that has gone unsatisfied to date. For example, while many paint colorization and dispensing systems may be observed in many home improvement establishments, the high air bubble content and high viscosity of liquid cosmetics has prevented the proliferation of analogous dispensing systems in cosmetic establishments.

The disclosed embodiments represent results that far surpass the product of normal or routine experimentation by those reasonably skilled in the art. Components and methods from unrelated disciplines were combined in unobvious and counter intuitive ways to derive the disclosed systems and methods.

Embodiments of the invention also include the use of custom software and custom pigment dispensers.

Embodiments of the invention may comprise three software modules, stored upon non-transitory computer readable mediums. A custom foundation software module analyzes, calculates and formulates precise compositions of scanned target area by use of colorimeter/spectrophotometers, cameras or webcams to obtain breakdown percentages of the color pigment/blenders used to custom blend foundation, concealer, tinted moisturizer, primer, beauty products and other custom cosmetic products.

A device driver custom software module receives the formulation software's color pigment/blenders' blending information to command the firmware of the custom cosmetic blending and dispensing machine, and operate the disclosed machinery accordingly.

An optional custom client file software module accepts all information of each customer and issues a Client ID card with customer number, and sends all information of the customer including her custom formulation analysis to the company's main server by remote network so that all store locations can share all customers' information, and that each customer can order her custom blending product from store location or even online at the company's website. Such file or information access may be confined to selected locations.

Dispensers for color blenders are used to dispense minuscule quantities of color blenders and base in waiting containers. In certain embodiments, containers of various sizes including a quarter of an ounce to 1.0 ounces. Such products include foundation, concealer, primer, tinted moisturizer and beauty products.

Disclosed custom color blending and dispensing machines may blend custom color within a container that is either pre-filled or not pre-filled with base material. All materials (bases and color blenders) used in this invention are sometimes homogenized for best mixing result and avoiding separation.

Each dispenser may be filled with color blenders or other materials such as thinners for a thin (sheer) or medium coverage foundation or moisturizer additives to make dry and combination types of foundation or beauty products. Thus, a water base thinner with preservative may be added to a foundation to create a more natural look (sheer or medium coverage) as opposed to a thick or heavy "caked-up" foundation, which is also called full coverage. The moisturizer additives may be comprised of water based moisturizing material and used to supplement dry or combination types of foundation as opposed to an oily type foundation. Thus, embodiments of the invention can not only formulate and dispense each woman's individual custom color product, but also can satisfy each customer's complicated multiple requirements including coverage choices and skin type choices accurately and in several minutes in front of customers.

The software may be used to calibrate the machinery and to derive the precise quantities, densities and viscosities of material used to make custom color make-up products.

In one disclosed process, containers, often a quarter of an ounce to 1.0 ounces are filled with white base make-up products. A color measuring device such as a colorimeter/spectrophotometer, camera or webcam may be used to measure color compositions of skin color in calibration with off the shelf color software such as Photoshop™ and/or the disclosed custom software, the measured skin color components are transmitted into a computer control unit having access to the color blenders, bases, thinner, and moisturizing additive dispensers. Using the color composition analysis from the coloring measuring device, color blenders, bases, with or without thinner or moisturizing additives are dispensed to the containers.

The containers may include steel, plastic, ceramic, glass or other types of balls. Such weight balls are helpful in thoroughly blending and mixing the contents of a container. Embodiments of the invention include the use of high frequency and vibration mixer/shakers of multiple shaking angles, distances and directions in the mixing process to obtain optimal mixing results.

The disclosed software and machinery systems include means and methods for entry and storage of a customer's name, address, phone number, color analysis report, purchase records, names of products purchased and other information. The software may be executed within a personal computer using a monitor, barcode scanner, label printer and customers' personal ID card printer. The software facilitates the printing of labels that may be affixed to each finished container and/or the customer ID cards useful to customers at other store locations and online purchase websites. All product and customer information may be shared from store to store via a an electronic network.

Embodiments of the invention match not only skin color but also skin type with the term "skin type" sometimes defined on a gradation scale ranging from oily skin, medium skin to dry skin. A skin type may be matched by adjusting the amount of moisturizer material and by adjusting the coverage. The coverage may be adjusted by dispensing different amounts of thinner. The term "sheer overage" sometimes refers a mixture having an amount of thinner.

Disclosed embodiments overcome shortfalls in the art by use of parasitic pumps, an efficient temperature regulation system keeping the system at or above 67 F or at preset limit, a sanitary tub system keeping the nozzles and other apertures clean between uses without the need for hand cleaning, an elevator assembly, conveyor assembly and sensor system to automatically accept receiving containers of differing dimensions and other features.

Disclosed embodiments overcome shortfalls in the art by use of an optical device such as webcam, camera, scanner and machine readable instructions to obtain consumer data and using the machine readable instructions to analyze a consumer's skin conditions such as hydration, aging, damage, UV damage and using the machine readable instructions to custom formulate a product using treatment and repair essences such as a moisturizer, rejuvenating material, anti-aging material, and UV damage repair material. The optical device and machine readable instructions also obtain color, texture, damaged natures and other information pertaining to a target area.

Disclosed embodiments include the use of a skin color database of approximately 100 to 2,000 human skin colors, the database in communication with the processor and the machine readable instructions including interpolation instructions to produce approximately 100 to 20,000 additional colors.

The other disclosed databases of beauty products or beauty product colors may also contain a database of product target colors with such a database in communication with the computer processor and the machine readable instructions, including interpolation instructions to produce additional colors. For example, a nail polish database may contain 1000 nail polish colors and via interpolation, have the ability to generate mixing instructions to produce 10,000 nail polish colors.

Disclosed embodiments include the use of a database of approximately of approximately 100 to 22,000 human skin colors, and interpolated colors the database in communication with the processor and the machine readable instructions including instructions to measure customer skin color and then match the measured skin color to the closest color in the database and then individually custom formulate and dispense the closest color. This embodiment is far afield from the related art wherein the creation of the human skin colors in the database is a product of preprogramming or predetermined color formulations.

Disclosed embodiments include the use of colorimeter/spectrophotometer and the use of a database of approximately 100 to 22,000 beauty product colors, the database in communication with the processor and the machine readable instructions including instructions to measure target area color and then match the measured target area color to the closest color in the database and then individually custom formulate and dispense the closest color in the desired beauty product. This embodiment is far afield from the related art wherein the creation of beauty product colors is a product of preprogramming or predetermined color formulations.

Disclosed embodiments include the use of hard plastic type material or make up pouches sometimes made and used for one time use and designed to avoid human contamination. Such hard make up pouches overcome shortfalls in the art wherein collapsible pouches are used.

Disclosed embodiments include the use of machine readable instructions driving or controlling dispensing mechanisms to have various choices or options in filling end product containers. Such options include the discharge of all material at once, the discharge of materials in a group sequence, the discharge of materials one at a time.

Disclosed embodiments include a database of approximately 100 to 2,000 human skin colors and subsequent interpolation of approximately 100 to 20,000 skin colors that fall on or in between the 100 to 2,000 or so human skin colors. Such embodiments overcome shortfalls in the art by eschewing the use of nonhuman skin colors and by using a limited and efficient color spectrum confined within human skin colors. Such disclosed systems add efficiencies by allowing for the use of light weight and small colorimeters that are more consumer friendly as compared to the large colorimeters of the related art. Disclosed embodiments achieve exceptionally excellent results by delivery of color tolerances of DE+/−1. Such tolerances are beyond the perception of the human eye. Disclosed embodiments include the use of a hand held colorimeter that captures an average target area color and the use of machine readable instructions that cause the processor and databases to search for the closest target area color stored within the database of approximately 100 to 20,000 interpolated skin colors and 100 to 2,000 predefined or prerecorded colors. Once a stored or interpolated target color is selected, the selected target color may be custom formulated and custom blended individually to achieve the desired attributes of dispensed foundations, concealers, tinted moisturizers) nail polish, hair dye, lipstick, lip gloss, blush, mascara, eyeliner eye shadow, beauty products and other products.

The disclosed use of hand held colorimeters may be used to collect an average color composition from a target area(s) of multiple colors collected to produce an averaged, common or safe color as opposed to a particular color. Disclosed embodiments include the use of colorimeters capturing or recording relatively small areas of target color, such that care must be used to not record upon an anomalous skin area containing a skin spot, rosacea, flackle, scar tissue, black head, pimple or other anomaly These and other objects and advantages will be made apparent when considering the following detailed specification when taken in conjunction with the drawings.

Figure 1A:
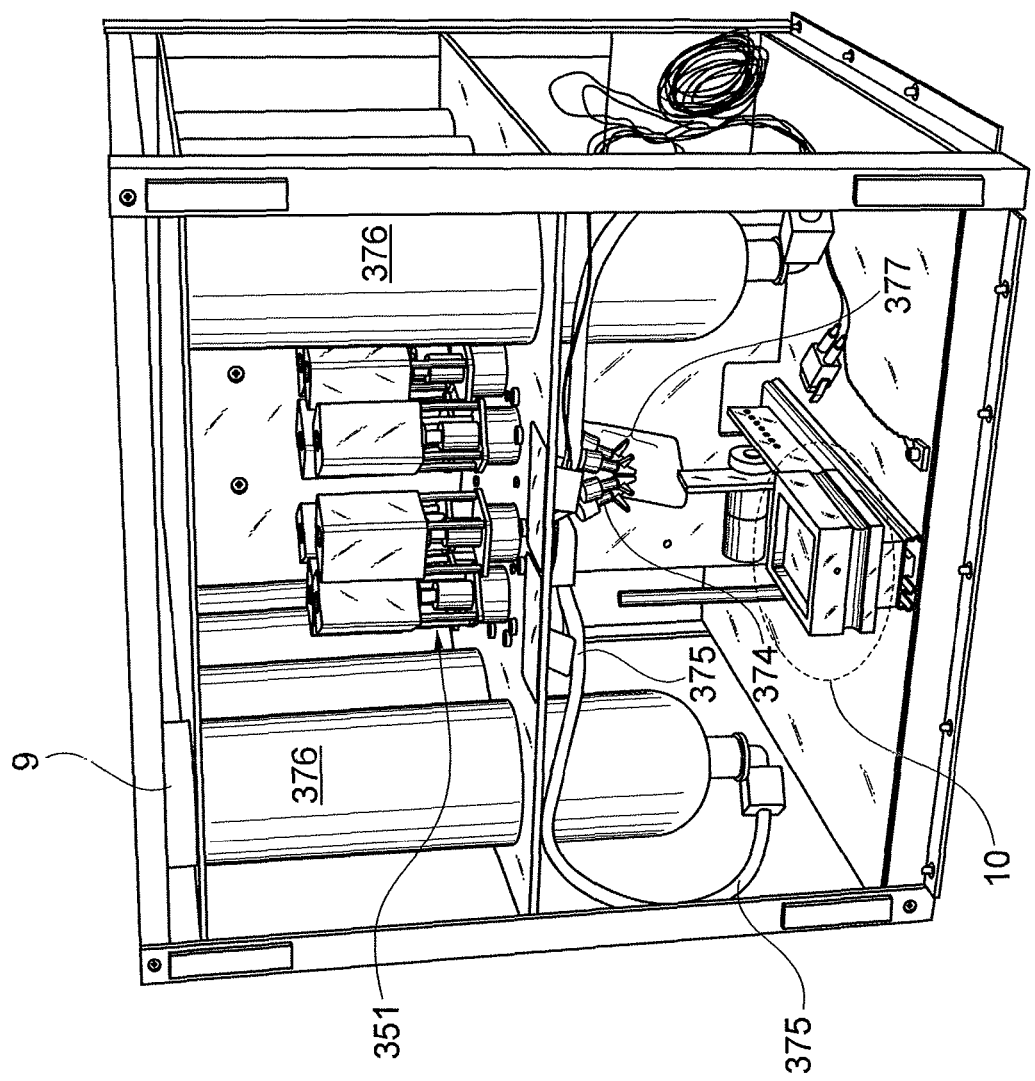
FIG. 1A depicts a perspective view of a custom cosmetic mixer and dispenser

REFERENCE NUMERALS IN THE DRAWINGS 8 automatic balance level sensors
9 canister cap and agitator rod assembly
10 automatic loader and unloader assembly
12 LED lights within the case or frame
13 exterior cover
200 vibrator and shaker machine
201 holding carriage of vibrator and shaker machine
202 holding strap of vibrator and shaker machine
300 hand held color spectrophotometer or colorimeter
301 computer system
302 webcam
350 peristaltic pump representation
351 stepper motors
352 a sectional view of a peristaltic pump
353 a sectional elevation view of a peristaltic pump
354 peristaltic pump made by Watson Marlow
370 needle nozzle representation
371 a first embodiment of a needle nozzle
372 a second embodiment of a needle nozzle
373 a third embodiment of a needle nozzle
374 a forth embodiment of a needle nozzle as found in FIG. 1A
375 flexible tubing
376 canister used to hold cosmetic material
377 an assembly of a plurality of needle nozzles positioned to fit within one container opening
400 human face
450 database of customer information
500 non-transitory non-signal computer readable medium
501 processor
502 main executable program
503 a general spectrophotometer device such as a webcam
504 subroutine for color analysis, derives mix of color
505 machine readable instructions for the firmware of a cosmetic blending machine
506 subroutine to manipulate customer data to generate information to print on a label and to transmit over a network 507 a network with may be connected to other cosmetic mixing systems 508 an embodiment of a custom cosmetic blending machine 509 a label printer 510 a container of custom color mixed cosmetics 511 a label generated by a label printer 512 a container of custom color mixed cosmetics with a label applied 600 a container of custom color mixed cosmetics with a brand label 700 a disclosed embodiment with a sanitary tub elevator 710 platform with adjustable height to accommodate containers of different heights 720 area reserved for stepper motor used to move the elevator assembly 730 elevator assembly sometimes used to move platform 710

740 sensors used to detect height of container to accept product 750 loader assembly, sometimes brings the platform in and out to the elevator 800 a curved needle embodiment

DETAILED DESCRIPTION OF EMBODIMENTS OF THE INVENTION

The following detailed description is directed to certain specific embodiments of the invention. However, the invention can be embodied in a multitude of different ways as defined and covered by the claims and their equivalents. In this description, reference is made to the drawings wherein like parts are designated with like numerals throughout.

Unless otherwise noted in this specification or in the claims, all of the terms used in the specification and the claims will have the meanings normally ascribed to these terms by workers in the art.

Unless the context clearly requires otherwise, throughout the description and the claims, the words "comprise," "comprising" and the like are to be construed in an inclusive sense as opposed to an exclusive or exhaustive sense; that is to say, in a sense of "including, but not limited to." Words using the singular or plural number also include the plural or singular number, respectively. Additionally, the words "herein," "above," "below," and words of similar import, when used in this application, shall refer to this application as a whole and not to any particular portions of this application.

The above detailed description of embodiments of the invention is not intended to be exhaustive or to limit the invention to the precise form disclosed above.

While specific embodiments of, and examples for, the invention are described above for illustrative purposes, various equivalent modifications are possible within the scope of the invention, as those skilled in the relevant art will recognize. For example, while steps are presented in a given order, alternative embodiments may perform routines having steps in a different order. The teachings of the invention provided herein can be applied to other systems, not only the systems described herein. The various embodiments described herein can be combined to provide further embodiments. These and other changes can be made to the invention in light of the detailed description.

Any and all the above references and U.S. patents and applications are incorporated herein by reference. Aspects of the invention can be modified, if necessary, to employ the systems, functions and concepts of the various patents and applications described above to provide yet further embodiments of the invention.

These and other changes can be made to the invention in light of the above detailed description. In general, the terms used in the following claims, should not be construed to limit the invention to the specific embodiments disclosed in the specification, unless the above detailed description explicitly defines FIG. 1A shows a working embodiment of the present invention which includes automatic balance level sensors 8, canister cap and agitator rod assemblies 9, an automatic loader and unloader assembly 10, a plurality of peristaltic pumps 351 connected to a plurality of needle nozzles. The assembly of needle nozzles 377 is arranged such that all nozzles point to a center location acceptable to dispense cosmetic material into a container. Some embodiments do no use an agitator.

Flexible tubing 375 connects a plurality of canisters 376 to the plurality of peristaltic pumps 351.

Automatic balance level sensors 8 are equipped to provide an alert when material in a canister reaches a low level. Firmware or other programs within a computer or other machine system may send a warning signal or graphic to a PC monitor. Without this sensor, an empty container may go unnoticed and a batch or run will be wasted.

Canister caps with agitator rod and end plate 9 are sometimes used to keep the inside canister clean and to prevent airflow. Materials can dry up and form solidified surface inside canister if air flows freely. Each time the cap is opened the agitator rod and end plate mix the material. Embodiments of the device work with or without an agitator.

The invented automatic loader and unloader 10 loads an empty container at the front opening and sends the container back to the precise position under all nozzles each time, and after dispensing is completed, the container will be sent back to the front opening. If no container is loaded, the machine will alert and not start dispensing. The nylon holder is designed to accommodate three different container shapes.

Figure 1B:
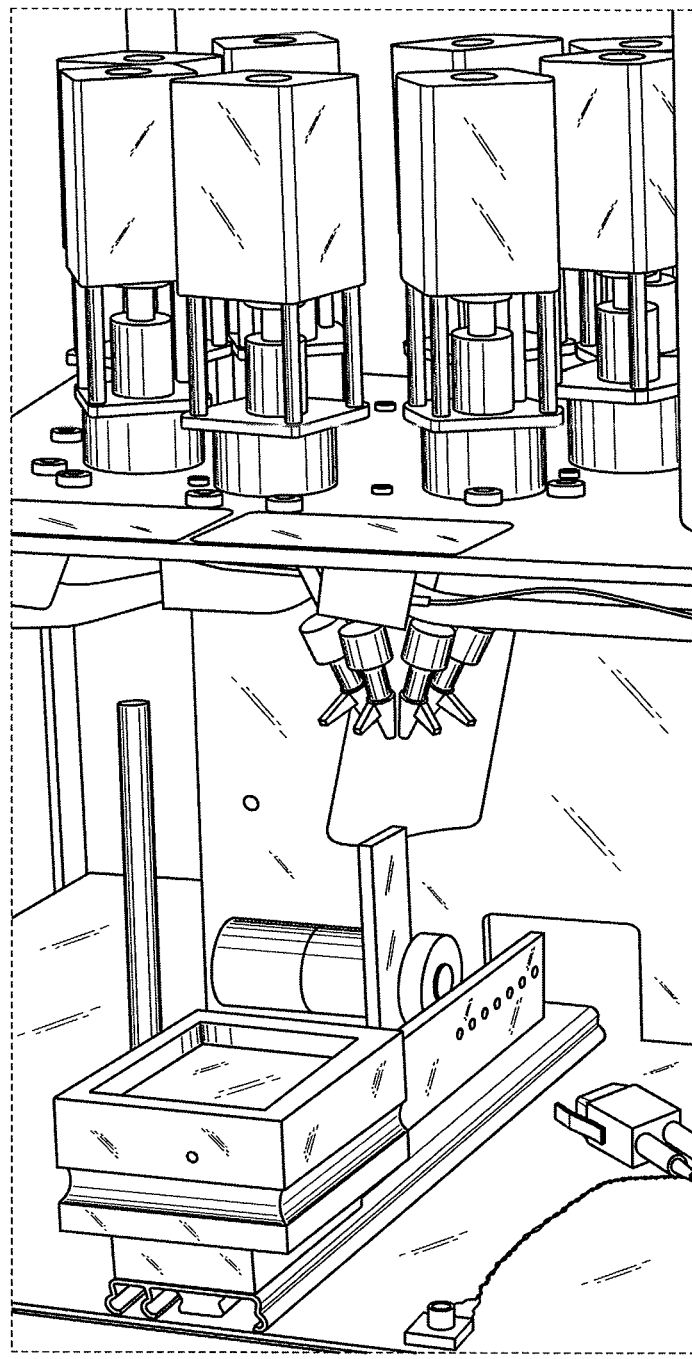
FIG. 1B depicts a perspective view of a custom cosmetic mixer and dispenser

FIG. 1B is a close up of FIG. 1A.

Figure 2:
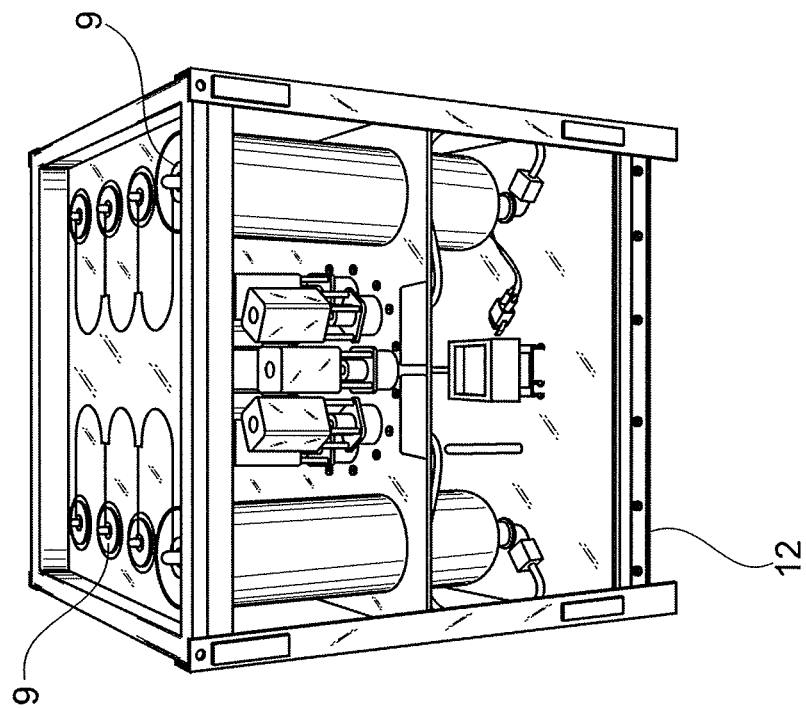
FIG. 2 depicts a perspective view of a case used to cover a custom cosmetic mixer and dispenser

FIG. 2 shows a disclosed blending and mixing machine within a cover, the cover assembly having LED lights 12. Top views of the canister cap and agitator rod assemblies 9 may be viewed on top of the machine.

Figure 3:
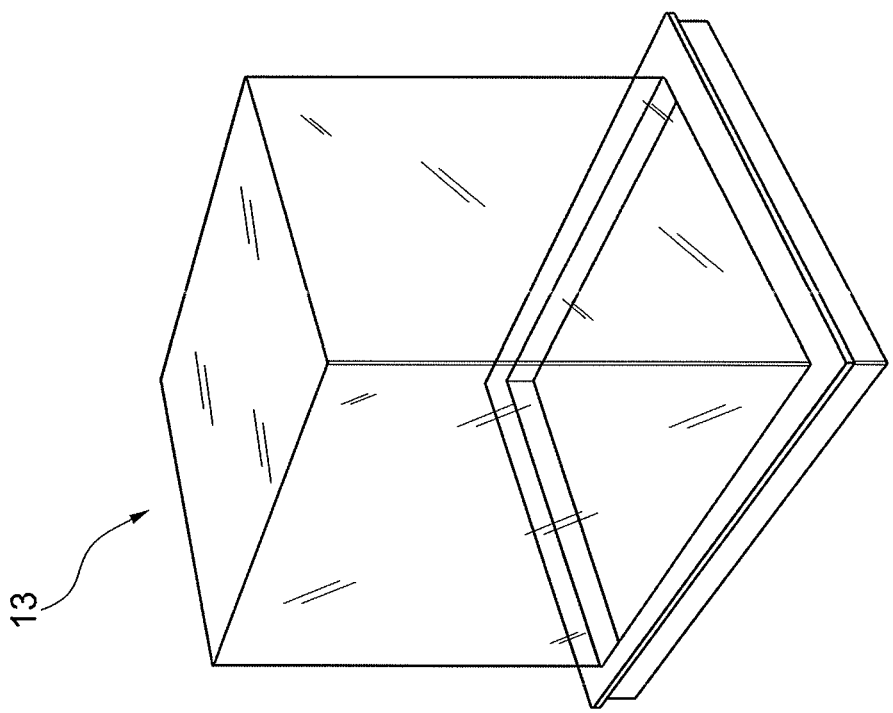
FIG. 3 depicts a perspective view of a custom cosmetic mixer and dispenser

FIG. 3 shows the case or cover 13 in general and not covering a machine. A pass through door is shown in use next to the human hand.

The case 13 for the dispenser machine is made of acrylic panel (Plexiglas) with LED lights at the bottom to create edge lighting effect all the way around perimeters of the cover.

Figure 4:
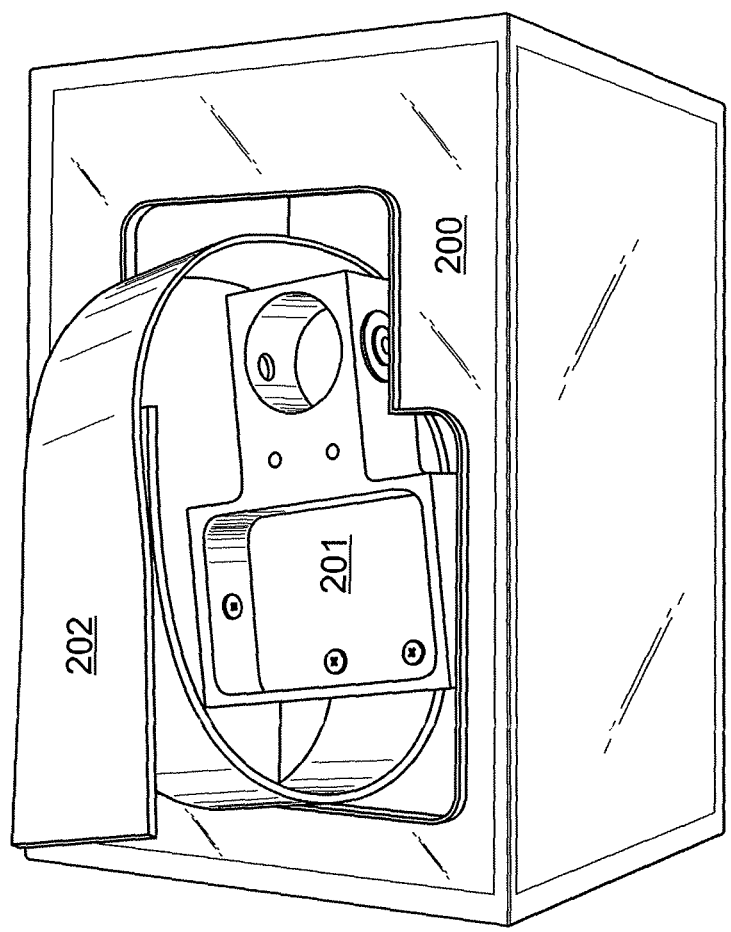
FIG. 4 depicts a perspective view of shaker

FIG. 4 provides a perspective view of a vibrator and shaker machine 200, having a holding carriage 201 and a holding strap 202. The shaker machine vibrates in varied strokes in all three directions, x, y and z. The mixing movements are varied such that cosmetic material stays mixed for over a year. The mixing movements mix material on the outside edges of the container as well as the inside portions of the container. Distances traveled by the holding carriage vary from $\frac{1}{8}^{th}$ of an inch to $\frac{3}{4}$ of an inch.

Figure 5A:
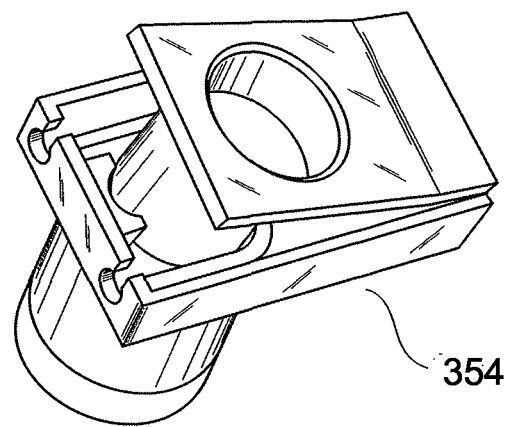
FIG. 5A depicts a perspective view of a peristaltic pump

FIG. 5A shows a perspective view of a peristaltic pump 354 manufactured by Watson Marlow. Discovery of the correct pump 354 was found by unordinary and excessive experimentation. The pump features flow rates from 30 µL/min to 30 ml/min and precision dispensing down to one microliter.

Liquid cosmetic products or beauty products such as foundation, concealer, primer, tinted moisturizer, etc. have tremendous air holes inside and very thick in viscosity, they do not come out or stop instantly when dispenser nozzles are commanded to dispense and stop. Regular dispensers such as stepper motors, auger screw dispensing, pinch valves, etc., have been tried but none could accurately actuate start and stop of dispensing liquid cosmetic materials. After many months of rigorous experimentation, creative thought and work in non-analogous systems, a peristaltic pump was discovered and controlled by disclosed systems. In one embodiment the peristaltic pump is from the medical field and is sometimes made by Watson Marlow. Peristaltic pumps work very well, but additional features and systems were added to pull the last drop of the cosmetic material back into the pump to avoid drop down after dispensing is completed. Experiments were conducted in air puffing to blow off the last drop, but in some embodiments seven separate material peristaltic pumps are used (Foundation Base, Concealer Base which may be used as White Blender, Black Blender, Red Blender, Yellow Blender, Thinner and Moisturizing Additives), requiring independent air puffing for each nozzles, requiring an unduly complicated and cumbersome system. But, pulling back the last drop into the pump was found to provide exceptional results. In the best mode known to date, the best results were found by waiting 2-3 seconds after completion of dispensing to form the last drop which is to be pulled back into the pump.

Another advantage of using a peristaltic pump is that it keeps pulling inside material from canisters to nozzles even if the tube goes up higher than the dispensing nozzle position without any additional or mechanical pushing or pulling devices, since the inside material is continuously connected from the canister to dispensing nozzle without any air break pocket.

Peristaltic pumps are used in very precise medical application for heart pump to deliver blood, and is very accurate and precise, and safe and last for a long time. Peristaltic pumps are driven by miniature stepper motors.

Special tubes 375 are used and are recommended by the peristaltic pump manufacturer. Such tubes 375 neither break nor form permanent bent shapes. These tubes a last for a long time and keep their original elasticity to bounce back after the pump rotor pinches the tube.

Figure 5B:
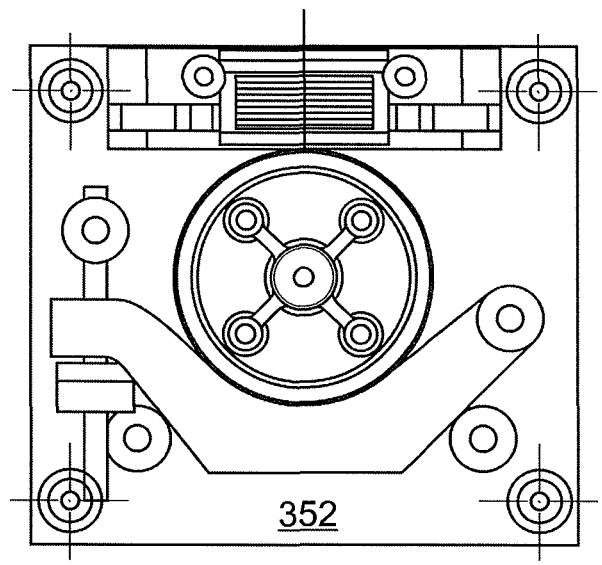
FIG. 5B depicts a sectional view of a peristaltic pump

FIG. 5B shows a sectional plan view 352 of the inner workings of a peristaltic pump.

Figure 5C:
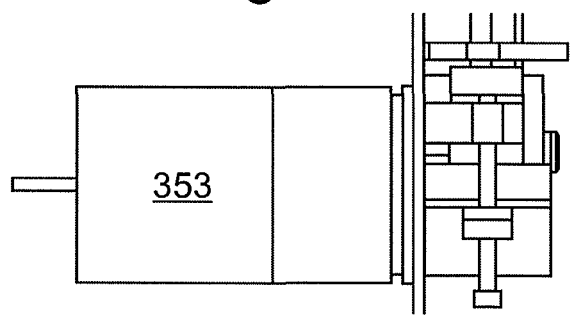
FIG. 5C depicts a sectional view of a peristaltic pump

FIG. 5C shows a sectional and elevation view 353 of a peristaltic pump.

Figure 6:
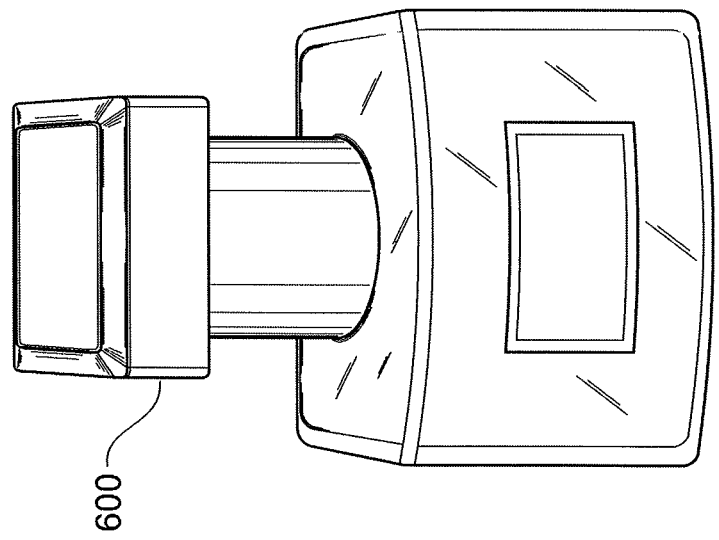
FIG. 6 depicts a container of custom mixed cosmetic product

FIG. 6 is a perspective view of a container of mixed cosmetic product 600 with a brand label.

Figure 7:
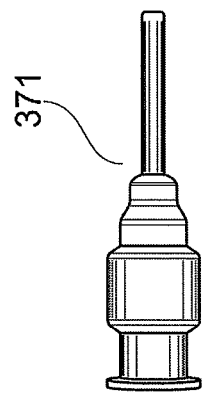
FIG. 7 depicts a first needle nozzle
Figure 8:
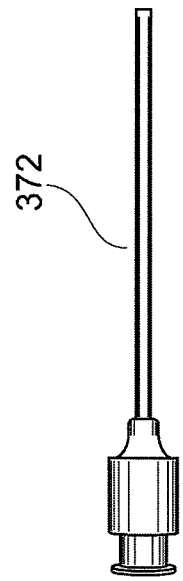
FIG. 8 depicts a second needle nozzle
Figure 9:
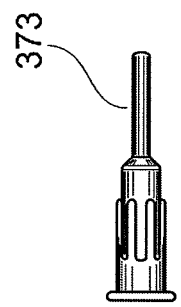
FIG. 9 depicts a third needle nozzle

FIGS. 7, 8 and 9 show reusable stainless steel precision dispensing needles made by McMaster-Carr. The needles, 371, 372, 373 are considered to be nozzles and are sometime called "Luer Lock Needles." The needles or nozzles may be considered to by triangular. The use of these needles with the disclosed peristaltic pump has provided unexpected results and has produced the first commercially viable custom color cosmetic blending and dispensing system.

The disclosed nozzle needles may be considered tapered. Due to extremely tiny nozzle hole size, straight needles created back pressure and made dispensing unsatisfactory. Triangle shaped nozzles minimized the back pressure and made efficient dispensing effective.

Figure 10:
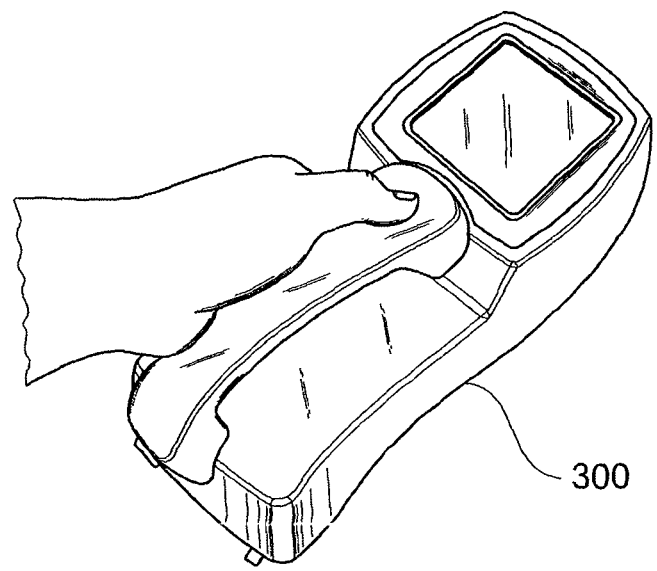
FIG. 10 depicts a hand held spectrophotometer

FIG. 10 is a hand held colorimeter/spectrophotometer 300 sometimes used to acquire color composition information regarding a customer's skin and/or target area coloration. Disclosed embodiments use a smaller handheld colorimeter to obtain an average color composition of multiple measured colors to produce an averaged, common or safe color as opposed to a particular color. The collection of a particular color may not always lead to an accurate skin color match or target color match and may lead to the production of an anomalous color, such as the color found upon a skin spot or blemish. A smart phone, webcam or other device may take the place of the hand held color colorimeter and spectrophotometer.

A colorimeter embodiment may include a plurality of beauty product databases, with each database comprising of approximately 100 to 2,000 recorded human body part colors and subsequent interpolation of approximately 100 to 20,000 body part colors that fall on or in between the 100 to 2,000 or so recorded human body part colors. A beauty product database may include the 100 to 20,000 or so interpolated human body partcolors and 100 to 2,000 predefined or recorded human body part colors. Such embodiments overcome shortfalls in the art by eschewing the use of nonhuman skin colors and by using a limited and efficient color spectrum confined within human body part colors. Such disclosed systems add efficiencies by allowing for the use of light weight, less expensive and small colorimeters that are more consumer friendly as compared to the large and expensive spectrophotometers of the related art. Disclosed embodiments achieve exceptionally excellent results by delivery of color tolerances of DE+/−1. Such tolerances are beyond the perception of the human eye. Body part colors may include colors used within or upon beauty products, the term beauty products broadly defined herein.

After the system finds the closest match to a color in a beauty product database (having approximately 100 to 20,000 interpolated colors and 100 to 2,000 human body partcolors), the closest matched color may then be individually custom formulated by use of a machine generated custom formulated mixture and/or mixing protocol. Thus, while the selected color may be found within a predetermined set of interpolated colors and human body part colors, the production of beauty product matching such color may be a function of a custom formula or recipe generated by the disclosed computer readable media, processor, databases, firmware, servers and/or other systems. Any beauty product may be produced and include nail polish, hair dye, lipstick, lip gloss, blush, mascara, eyeliner eye shadow and other products.

Figure 11:
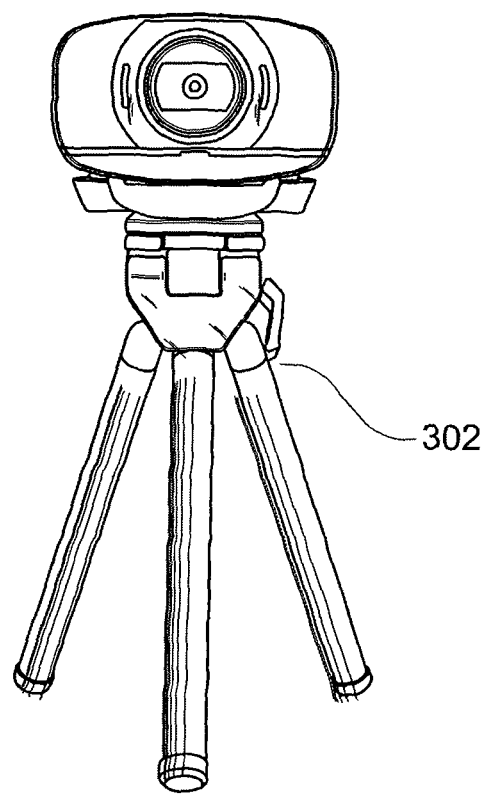
FIG. 11 depicts a webcam

FIG. 11 is a webcam 302 which may be a high definition webcam sometimes used to acquire color composition information regarding a customer's skin coloration. A webcam 302, smart phone or similar optic device may be used to facilitate live video chat sessions wherein consumers consult with system operators to achieve accurate skin and/or target area scans. Consumers using webcams to present themselves to system operators may receive lighting and positioning instructions to improve the accuracy of webcam color scans. Also, a user interface on the system side may allow a system operator to adjust webcam angles, focus, lighting and other variables.

Figure 12:
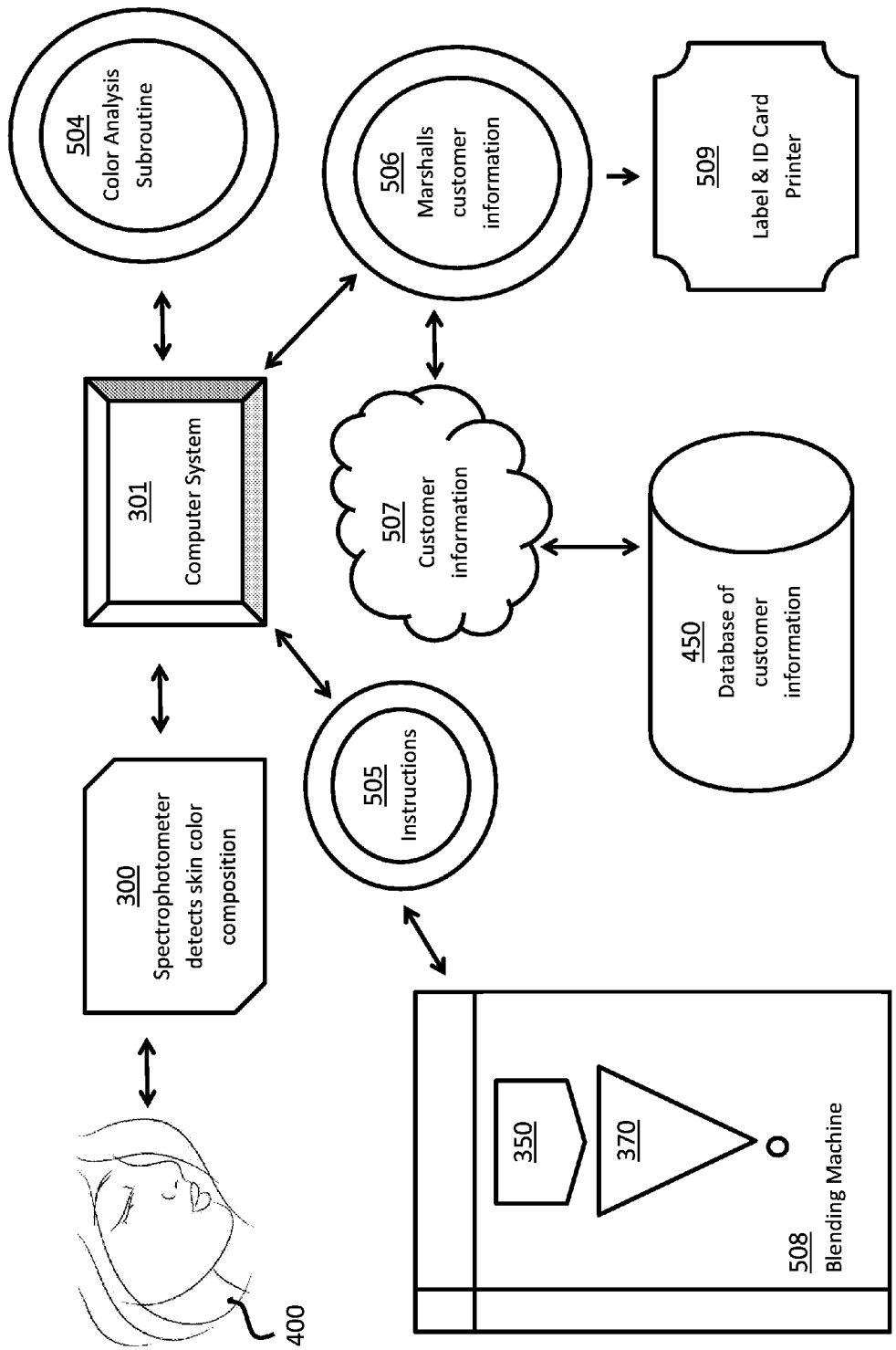
FIG. 12 is a flow chart of a disclosed system

1. FIG. 12 provides a schematic view of one contemplated flow chart of operations. A colorimeter/spectrophotometer 300 or webcam examines an area of selected customer skin found upon a customer's face 400 or other body part, such as a target area which may include any body part such as hair, nails or a preexisting product such as a beauty product which may comprise foundation, concealer, tinted moisturizer, primer, skin care products, nail polish, blush, hair dye, lipstick, lip gloss, mascara, eye liner and eye shadow.

Several areas may be measured to find an average. Data from the colorimeter/spectrophotometer or other color measuring instrument is accepted into a computer system 301. The computer system 301 may comprise a processor 501, a specialized processor, a non-transitory computer readable medium 500 containing machine readable instructions, memory, storage and other computer components. A main set of instructions may include a color analysis subroutine 504 or module that analyzes a customer's skin color composition and creates machine readable instructions 505 to cause the custom cosmetic mixing and dispensing machine 508 to mix the desired colors of cosmetic and/or beauty products. The color analysis subroutine 504 accepts color information and derives the proper amount of pigments, thinners and additives to dispense. The color analysis subroutine 504 also derives proper values for product density, viscosity and other properties.

A customer module or customer subroutine 506 compiles customer personal information comprising color analysis, labels, identification cards and other items.

The machine readable instructions 505 for the firmware are transmitted to the dispensing machine 508. The dispensing machine or blending machine comprises a plurality of dispensing pumps, such as peristaltic pumps 351 wherein pigment, thinner, additives and other materials are pumped into waiting containers filled with white base material. The peristaltic pumps may be connected to needle nozzles 370 that direct material into a waiting container.

Dispenser driver software 505 and the dispenser machine firmware are designed to make adjustments after original color formulation and dispensing for features such as:

A. To make lighter shade in 3 different levels
B. To make darker shade in 3 different levels
C. To make more red shade in 3 different levels
D. To make more yellow shade in 3 different levels
E. To make more dry type or combination type
F. To make more sheer or medium coverage The customer information module or subroutine 506 may transmit customer information into a network system 507 such that a database 450 of customer information may be made available to other stores using embodiments of the disclosed systems. The customer subroutine 506 may also be used with a label and/or ID card printer 509 to produce labels for containers and ID cards for customers to have for future reference. The produced labels may be affixed to containers of produced cosmetics or otherwise such label may be affixed on Customer ID Card for the benefit of a customer.

Figure 13:
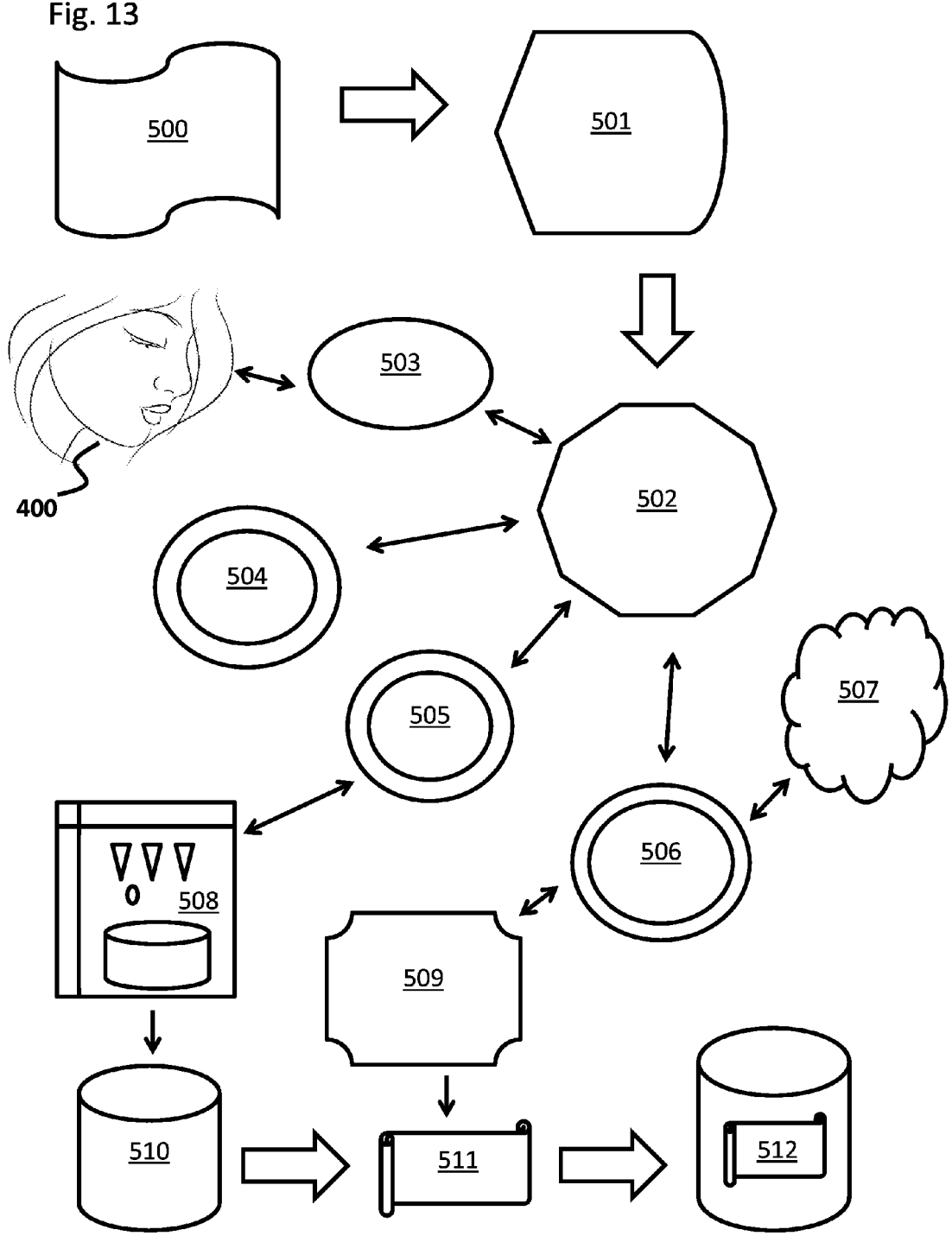
FIG. 13 is a schematic of a disclosed system

FIG. 13 presents non-transitory non-signal computer readable medium 500 containing machine readable instructions executed by a processor 501 or specialized processor to run a main executable program 502. A general spectrophotometer device 503 such as a webcam or colorimeter may collect color composition data from a face 400 or other target area. The collected color composition data is sent to a subroutine for color analysis 504 wherein a mix of beauty product color and other instructions are derived.

The subroutine or program for color analysis 504 may create machine readable instructions 505 suitable for execution by firmware executed by a processor found within a custom cosmetic blending machine 508.

A custom cosmetic blending machine 508 may add mixed cosmetic material or beauty product into a container 510. A label 511 may be printed by a printer 509, the printer accepting instructions from a subroutine 506 to manipulate customer data to generate information to print on a label and to transmit over a network 507.

A container with custom color mixed cosmetic or beauty product with a label applied 512 may be then further mixed by use of a vibrator and shaker machine. Such a vibrator and shaker machine may be used before a label 511 is applied to the container.

To ensure the highest levels of hygiene and sanitation, cosmetic products or beauty products are not touched by human hands. Cosmetic products are inserted into the canisters by use of squeezable plastic containers that are secured to the top of the canisters. Thus, every effort is made to keep all bacteria and contaminates out of the disclosed systems and products.

In yet another embodiment, web cameras and other video acquisition tools are used to communicate in real time with a customer. An operator of the system may speak with a customer to ask the customer to adjust lighting, camera angles, focus and other variables to obtain the best possible data pertaining to human skin color or other target area On the system side, an operator of the system may adjust angle, focus, lighting, contrast and other controls. This remote camera or webcam embodiment saves customers time and money by not having to travel to a store front location.

Figure 14:
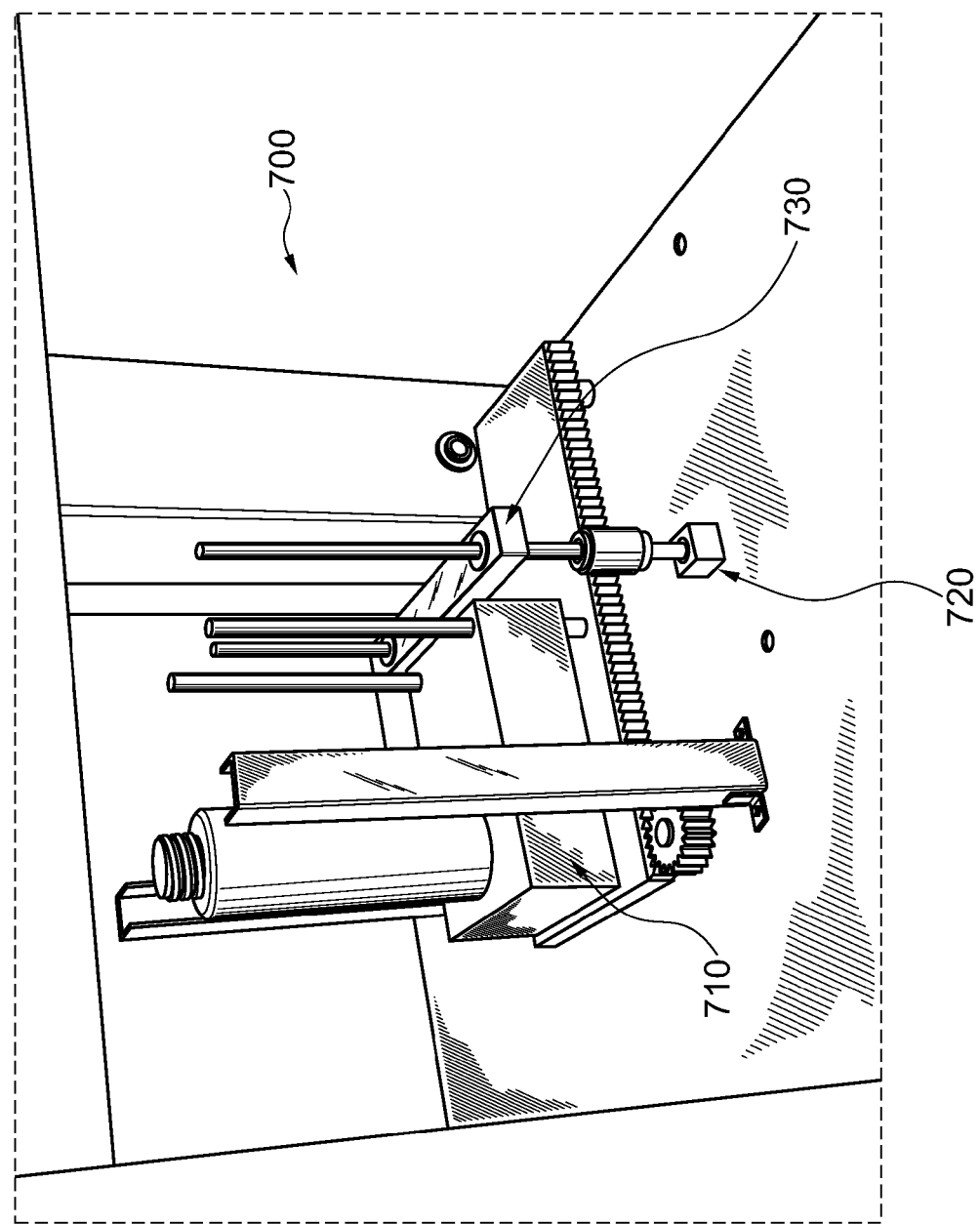
FIG. 14 depicts a perspective view of a disclosed system

FIG. 14 depicts a disclosed embodiment 700 sometimes using a sanitary tub. In this embodiment, a motor may rest in an area 790 below an elevator assembly 730. The elevator assembly 730 may adjust the height of a platform 710, the platform sometimes used to support containers of different heights.

Figure 15:
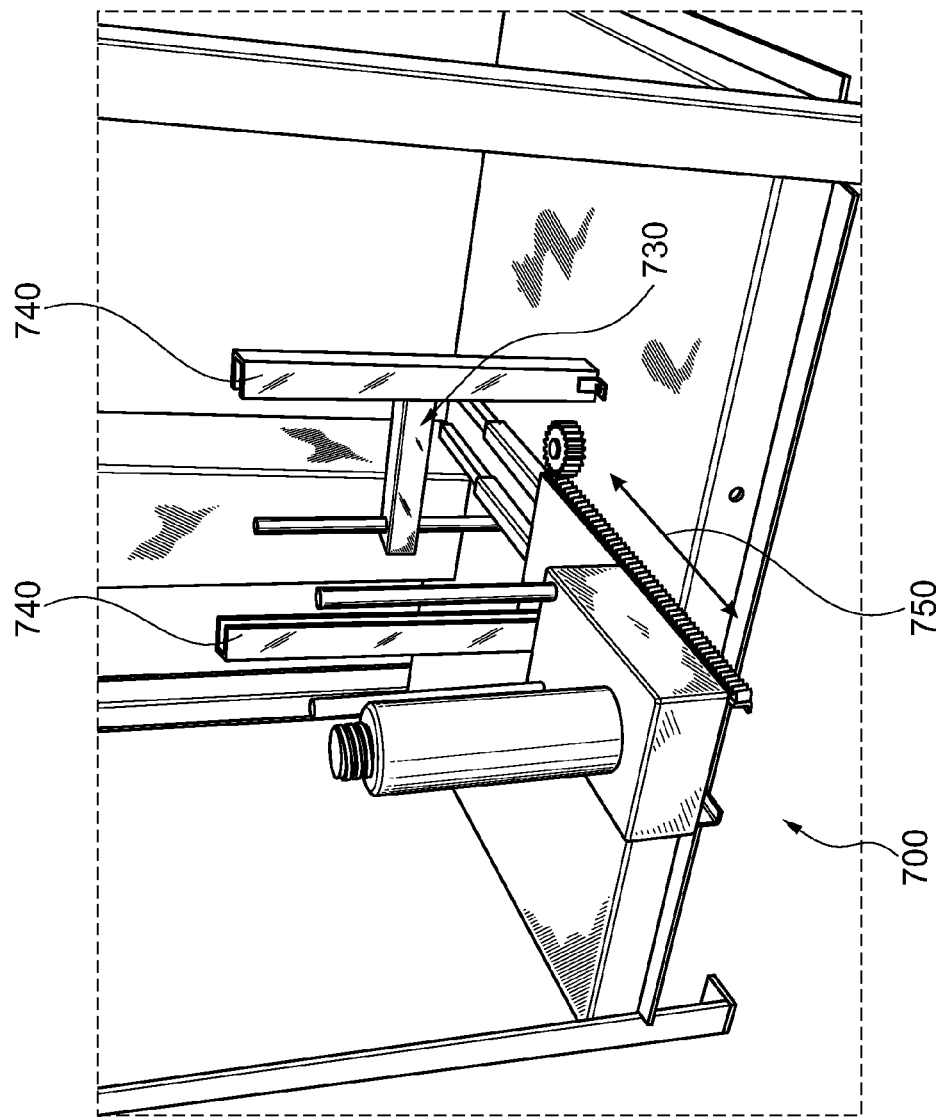
FIG. 15 depicts a perspective view of a disclosed system

FIG. 15 depicts the alternative configuration 700 also shown in FIG. 14. In FIG. 15, sensors 740 are sometimes used to detect the height of a container so that the platform may be set to an appropriate height. A loader 750 has directional movement as shown by the directional arrows and sometimes moves the platform in and out to the elevator assembly.

While not shown, a small tub or container is sometimes placed upon the loader 750. The tub may contain stabilizing liquid to prevent the nozzles and other apertures of the needles and motors clear of dried fluid or other debris.

In embodiment 700, a sponge wheel is not used to moisten or cover the nozzles, but a tub, sometimes called a sanitary tub may contain water, and sometimes purified or filtered water in combination with alcohol to fill the open ends of nozzles and other orifices with the system is not in use.

Disclosed embodiments include the use of strainers and other filter systems within the bottom portions of canisters. Such strainers are used to protect the tubes, peristaltic pumps, needles, nozzles and other system components from fouling or otherwise being obstructed by dried fluid or other debris.

Disclosed embodiments include the use of heater and fan system sometimes used to keep the system at or above 68 degrees F. or at preset limit to maintain a fluid viscosity of all liquid materials.

Disclosed embodiments include the original formulation of color for each customer and eschew the prior art penchant for using preprogrammed or pre-stored formulas. The fabrication of individual custom color formulas has achieved unexpectedly excellent results and represents a paradigm shift from the teaching of the prior art. Disclosed embodiments recognize that each individual's skin color, body part color and/or beauty product color is as unique as a person's fingerprints or DNA. The disclosed systems are able to provide individual color formulas and artfully dispense such formulas with enough nuance to make obsolete the pre-stored formula system of the prior art.

Disclosed embodiments obtain exceptionally accurate target color and texture readings by reading just one area of a target area, as opposed to the prior art method of taking several samples and deriving a dissatisfying average value.

Disclosed embodiments are not limited in nozzle shape with regard to dispensing. Disclosed embodiments are not limited to specific downsizing to tubes and manifolds due to the various advantages of the disclosed embodiments.

Disclosed embodiments include the mixing of material along all three directions of movement, X, Y & Z and includes variation of direction and speed to achieve optimal mixing.

Disclosed embodiments eschew valueless pumps and collapsible pouches and favor peristaltic pumps and replaceable, cleanable canisters.

Figure 16:
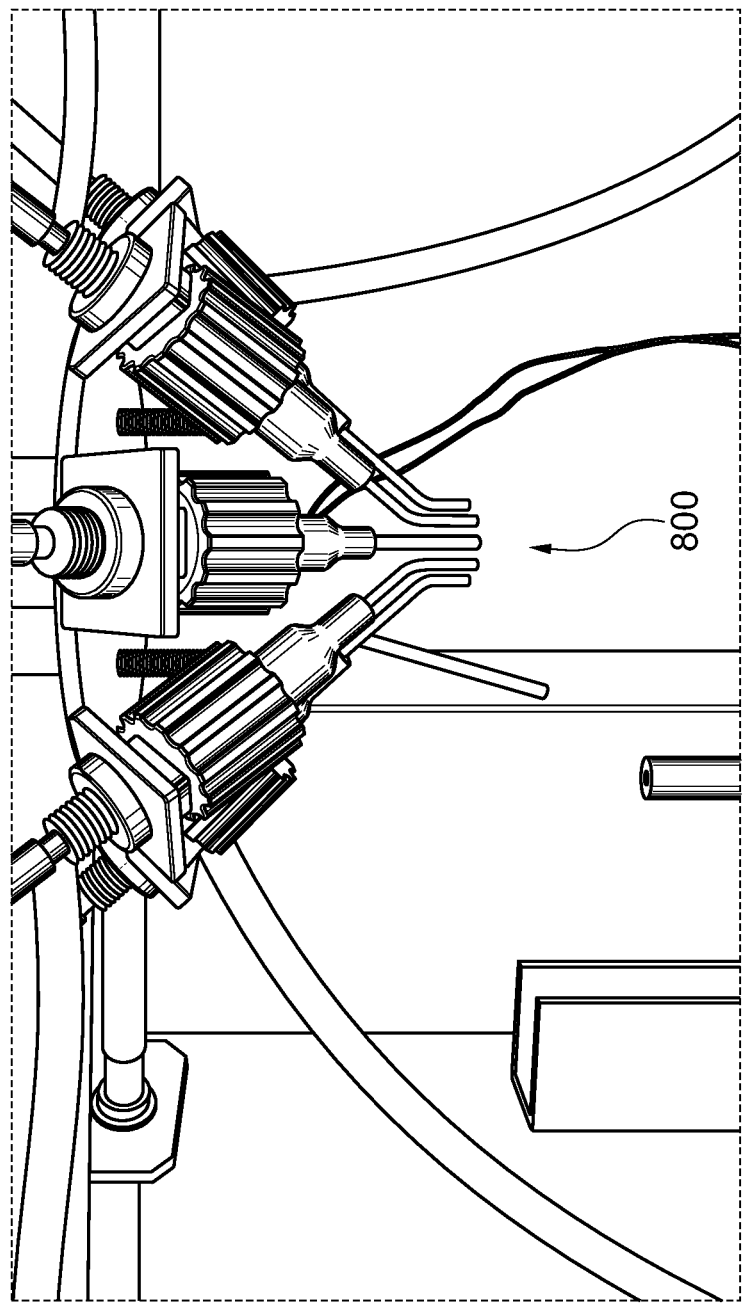
FIG. 16 depicts a bent or curved needle embodiment

FIG. 16 depicts bent needles 800. The angle of the needle depends on the needle assembly unit's spacing, but the best mode known to date about 60 degrees.

Bent needles may have a length is 20-25 mm with a length of 7-10 mm in a vertical portion. The disclosed bent needle system 800 provides an advantage in that bent needles will shoot or dispense all materials straight down to the bottom of a bottle. The bent needles allow for the use of smaller receptacle containers and a tighter configuration of multiple needles.

Not all databases described herein are illustrated but are duly disclosed. For example, a disclosed embodiment includes the use of a database of approximately 100 to 22,000 human skin colors, the database in communication with the processor and the machine readable instructions including instructions to measure customer skin color and then match the measured skin color to the closest color in the database and then individually custom formulate and dispense the closest color. Each beauty product may have its own analogous database and related functions to produce custom mixed beauty products in similar fashion.

Another database disclosed and described herein but not specifically illustrated is a database of dispensing sequences sometimes used by the peristaltic pumps. The peristaltic pumps may dispense material in various manners including dispensing all materials at once, dispensing materials in predefined group sequences, and dispensing materials from each peristaltic pump in seriatim in a predefined sequence.

Another database disclosed and described herein but not specifically illustrated is a database of approximately 100 to 2,000 human skin colors and a another database of approximately 100 to 20,000 colors derived by interpolation of the 100 to 2,000 human skin colors. Each beauty product may have its own analogous database of different part of human body parts and product samples, and related functions to produce custom mixed beauty products in similar fashion.

Disclosed embodiments include machine readable instructions causing a colorimeter to capture an averaged, common or safe color found upon a customer's skin or other target area, the machine readable instructions further causing the processor to find a closest match from the database of approximately 100 to 20,000 interpolated skin colors and 100 to 2,000 human body part colors. After selection of the closet matching interpolated body part color, the machine readable instructions may then cause the system to generate a custom formula to produce the selected color. The custom formulation of a selected interpolated color or beauty product color color provides new efficiencies over the prior art, saves space within databases, reduces processor time, obviates the need for a formula database and allows for the use of a less expensive lightweight and handheld colorimeter.

Embodiments of the disclosed systems and methods include the following items.

Item 1. A system for producing custom color mixed cosmetics matching a target area, the system comprising:

a) non-transitory non-signal computer readable medium 500 containing machine readable instructions;

b) a processor 501;

c) a main executable program 502 in communication with the processor 501, the main executable program in communication with a first subroutine 504 for color analysis, the first subroutine in communication with a general spectrophotometer device 503;

d) a set of machine readable instructions 505 in communication with firmware located upon a custom cosmetic blending machine 508, the set of machine readable instructions transmitted from the first color analysis subroutine 504, the machine readable instructions including color mixing instructions communicated to a plurality of peristaltic pumps 350, e) the peristaltic pumps connected to flexible tubing 375 and canisters 376 connected to the flexible tubing;

f) a needle nozzle 371 attached to each of the peristaltic pumps;

g) the custom cosmetic blending machine 508 including one or more automatic balance level sensors 8, the sensors in communication with the main executable program 502;

h) the canisters 376 attached to canister cap; and i) a second subroutine 506 manipulating customer data and generating machine readable data in communication with a printer 509 and in communication with an electronic network 507.

Item 2. The system of item 1 wherein each needle nozzle 371 is configured to direct cosmetic material into one area within a container 510.

Item 3. The system of item 2 including a vibrator an shaker machine 200 having a holding carriage 201 and holding strap 202 and the vibrator and shaker machine moves the holding carriage in the x, y and z directions in movements ranging from ⅛ of an inch to ¾ of an inch.

Item 4. The system of item 2 including a computer system 301 within the custom cosmetic blending machine 508, the computer system in communication with the firmware located upon the custom cosmetic blending machine.

Item 5. The system of item 1 wherein each needle nozzle is triangular in shape.

Item 6. The system of item 1 wherein the general spectrophotometer device 503 contains color composition data from two or more areas of human skin.

Item 7. The system of item 1 further comprising a webcam electronically connected to the electronic network.

Item 8. A method for producing custom color mixed cosmetics matching the skin coloration of a consumer 400, the method comprising the steps of:

a) using non-transitory non-signal computer readable medium 500 containing machine readable instructions;

b) using a processor 501 to execute the machine readable instructions;

c) using a main executable program 502 in communication with the processor 501, the main executable program in communication with a first subroutine 504 for color analysis, the first subroutine in communication with a general spectrophotometer device 503;

d) using a set of machine readable instructions 505 in communication with firmware located upon a custom cosmetic blending machine 508, the set of machine readable instructions transmitted from the first color analysis subroutine 504, the machine readable instructions including color mixing instructions communicated to a plurality of peristaltic pumps 350, e) using the peristaltic pumps connected to flexible tubing 375 and canisters 376 connected to the flexible tubing;

f) using a needle nozzle 371 attached to each of the peristaltic pumps;

g) using the custom cosmetic blending machine 508 with one or more automatic balance level sensors 8, the sensors in communication with the main executable program 502;

h) using the canisters 376 attached to canister;

i) using a second subroutine 506 manipulating customer data and generating machine readable data in communication with a printer 509 and in communication with an electronic network 507.

Item 9. The method of item 8 wherein each needle nozzle 371 is configured to direct cosmetic material into one area within a container 510.

Item 10. The method of item 9 using a vibrator and shaker machine 200 having a holding carriage 201 and holding strap 202 and the vibrator and shaker machine moving holding carriage in the x, y and z directions in movements ranging from ⅛ of an inch to ¾ of an inch.

Item 11. The method of item 9 using a computer system 301 within the custom cosmetic blending machine 508, the computer system in communication with the firmware located upon the custom cosmetic blending machine.

Item 12. The method of item 9 using needle nozzles triangular in shape.

Item 13. The method of item 9 using the general spectrophotometer device 503 containing color composition data from two or more areas of human skin.

Item 14. The method of item 9 using a webcam electronically connected to the electronic network and using the webcam to communicate with consumers.

Item 15. The method of item 14 using the webcam to instruct consumers to obtain scans of consumers' skin.

Item 16, the method of item 15 using interface controls to adjust the images provided by the webcam.

Item 17. The method of item 16 using views obtained from the webcam as a basis of instructing consumers to make adjustments in presentation of a consumer's face to a webcam.

Item 18. The method of item 16 using views obtained from the webcam as a basis of obtaining skin texture information.

Item 19. The method of item 18 wherein an amount of moisturizer material is dispensed to match the skin texture information.

Item 20. The method of item 18 wherein an amount of thinner material is dispensed to match the skin texture information.

Item 21. A system comprising an elevator assembly, conveyor assembly, sanitary tub system and heating system.

Item 22. A method for producing custom color mixed cosmetics based upon a custom formula obtained from a colorimeter/spectrometer reading and its custom formulation software of a consumer's skin, the method comprising:

a) using non-transitory non-signal computer readable medium containing machine readable instructions;

b) using a processor to execute the machine readable instructions;

c) using a main executable program in communication with the processor, the main executable program in communication with a first subroutine for color analysis, the first subroutine in communication with a colorimeter/spectrophotometer device;

d) using a set of machine readable instructions in communication with firmware located upon a custom cosmetic blending machine, the set of machine readable instructions transmitted from the first color analysis subroutine, the machine readable instructions creating custom color mixing instructions based upon a skin color measurement obtained from the general spectrophotometer device, and the custom color mixing instructions controlling a plurality of peristaltic pumps, e) using the peristaltic pumps connected to flexible tubing and canisters connected to the flexible tubing;

f) using a bent needle nozzle attached to each of the peristaltic pumps such that the bent needle nozzles direct fluid to a center section of a consumer container;

g) using the canisters attached to canister caps and using strainers within the canisters to prevent foreign material from entering the bent needle nozzles;

h) using a sanitary elevator and tub, the tub storing alcohol and the sanitary elevator raising the tub to contain the bent nozzle needles when the bent nozzle needles are not in use, the sanitary elevator including a sensor measuring the height of the tub to position the tub at a correct elevation to store the bent nozzle needles within the alcohol; and i) using a heater, fan and thermal sensor to prevent the machine from reaching a temperature below 67 F degrees or at a preset limit.

Item 23. A system for producing custom color mixed cosmetics from a custom formula producing a color selected from a database of interpolated colors and collected human skin colors using a colorimeter to obtain an averaged color from a customer's skin, the system comprising:

a) non-transitory non-signal computer readable medium containing machine readable instructions;

b) a processor;

c) a main executable program in communication with the processor, the main executable program in communication with a first subroutine for color averaging, the first subroutine in communication with a hand held colorimeter device, the handheld colorimeter device using the first subroutine to obtain an averaged skin color in response to exposure to a customer's skin;

d) a set of machine readable instructions in communication with firmware located upon a custom cosmetic blending machine, the set of machine readable instructions transmitted from the first color analysis subroutine, the machine readable instructions creating custom color mixing instructions to create a color selected as a closest match a database of approximately 20,000 interpolated colors and 2,000 human skin colors, the interpolated colors derived from use of approximately 2,000 human skin tone colors the custom color mixing instructions controlling a plurality of peristaltic pumps, e) the peristaltic pumps connected to flexible tubing and canisters connected to the flexible tubing;

f) a bent needle nozzle attached to each of the peristaltic pumps such that the bent needle nozzles direct fluid to a center section of a consumer container;

g) the canisters attached to canister caps, and the canisters having strainers to prevent foreign material from entering the bent needle nozzles;

h) a sanitary elevator and tub, the tub storing alcohol and the sanitary elevator raising the tub to contain the bent nozzle needles when the bent nozzle needles are not in use, the sanitary elevator including a sensor measuring the height of the tub to position the tub at a correct elevation to store the bent nozzle needles within the alcohol; and i) a heater and fan attached to a thermal sensor, the heater and fan preventing the machine from reaching a temperature below 67 F degrees.

Item 24. The system from above including a vibrator and shaker machine having a holding carriage and holding strap and the vibrator and the shaker machine moves the holding carriage in the x, y and z directions.

Item 25. The system from above wherein each needle nozzle is triangular in shape.

Item 26. The system from above wherein the colorimeter r device contains color composition data from two or more areas of human skin.

Item 27. The system from above further comprising a webcam electronically in communication with the processor.

Item 28. The system from above including a database of approximately 100 to 2,000 human skin colors, the database in communication with the processor and the machine readable instructions including interpolation instructions to produce approximately 100 to 20,000 additional colors.

Item 29. The system from above including a database of approximately 22,000 human skin colors, the database in communication with the processor and the machine readable instructions including instructions to measure customer skin color and then match the measured skin color to the closest color in the database and then individually custom formulate and dispense the closest color.

Item 30. The system from above wherein the canisters are of a cartridge configuration, for one time use and wherein the canisters are not collapsible.

Item 31. The system above wherein the machine readable instructions instruct the plurality of a plurality of peristaltic pumps to dispense material in a manner comprising the group of: dispensing all materials at once, dispensing materials in predefined group sequences, and dispensing materials from each peristaltic pump in seriatim in a predefined sequence.

Item 32. A method for producing color cosmetics based upon a custom formula used to match a color selected from a database of approximately 20,000 interpolated colors and 2,000 human skin colors, the method comprising:

a) using non-transitory non-signal computer readable medium containing machine readable instructions;

b) using a processor to execute the machine readable instructions;

c) using a main executable program in communication with the processor, the main executable program in communication with a first subroutine for color averaging, the first subroutine in communication with a colorimeter with the colorimeter using the first subroutine to obtain an average skin color from a customer's skin;

d) using a set of machine readable instructions in communication with firmware located upon a custom cosmetic blending machine, the set of machine readable instructions transmitted from the first color analysis subroutine, the machine readable instructions creating custom color mixing instructions based upon using the average skin color to find closest match to a skin color found within a database of approximately 20,000 interpolated skin colors and 100 to 2,000 human skin colors, the interpolated skin colors derived from a database of approximately 100 to 2,000 human skin colors and the custom color mixing instructions controlling a plurality of peristaltic pumps, e) using the peristaltic pumps connected to flexible tubing and canisters connected to the flexible tubing;

f) using a bent needle nozzle attached to each of the peristaltic pumps such that the bent needle nozzles direct fluid to a center section of a consumer container;

g) using the canisters attached to canister caps and using strainers within the canisters to prevent foreign material from entering the bent needle nozzles;

h) using a sanitary elevator and tub, the tub storing alcohol and the sanitary elevator raising the tub to contain the bent nozzle needles when the bent nozzle needles are not in use, the sanitary elevator including a sensor measuring the height of the tub to position the tub at a correct elevation to store the bent nozzle needles within the alcohol and/or mixture of alcohol and water; and i) using a heater, fan and thermal sensor to prevent the machine from reaching a temperature below 67 F degrees or at a preset limit.

Item 33. The method above wherein pouches are not used as canisters and the canisters are of a cartridge configuration, for one time use and wherein the canisters are not collapsible and using a vibrator and shaker machine having a holding carriage and holding strap and the vibrator and shaker machine moving holding carriage in the x, y and z directions.

Item 34. The method above using a computer system within the custom cosmetic blending machine, the computer system in communication with the firmware located upon the custom cosmetic blending machine.

Item 35. The method above using the colorimeter device containing color composition data from two or more areas of human skin.

Item 36. The method above using the colorimeter device to obtain color composition data from only one area of human skin.

Item 37. The method above using views obtained from the colorimeter device as a basis of obtaining skin texture information.

Item 38. The method above using the colorimeter device to obtain consumer data and using the machine readable instructions to analyze a consumer's body part conditions such as hydration, aging, damage, UV damage and using the machine readable instructions to custom formulate a product such as a moisturizer, rejuvenating material, anti-aging material, and UV damage repair material nail polish, hair dye, lipstick, lip gloss, blush, mascara, eyeliner eye shadow and other products.

Item 39. The method above using a database of approximately 100 to 2,000 human body part colors, the database in communication with the processor and the machine readable instructions including interpolation instructions to produce approximately 100 to 20,000 additional colors.

Item 40. The method above using a database of approximately 100 to 22,000 beauty product colors, the database in communication with the processor and the machine readable instructions including instructions to measure a target area and then match the measured target area color to the closest color in the database and then individually custom formulate and dispense the closest color.

Item 41. The method above using canisters of a cartridge configuration, for one time use and wherein the canisters are not collapsible.

Item 42. The method above using machine readable instructions instruct the plurality of a plurality of peristaltic pumps to dispense material in a manner comprising the group of: dispensing all materials at once, dispensing materials in predefined group sequences, and dispensing materials from each peristaltic pump in seriatim in a predefined sequence.

Further items include:

A system for producing one or more beauty products, the beauty products comprising foundation, concealer, tinted moisturizer, primer, skin care products, nail polish, blush, hair dye, lipstick, lip gloss, mascara, eye liner and eye shadow, from an individually created custom formula producing a color selected from a database of interpolated colors, human body part colors and colors of beauty products using a color capture device to obtain color information from a target area, the target area selected from the group comprising a human body part or beauty product, the system comprising:

a) non-transitory computer readable medium containing machine readable instructions;

b) a processor;

c) a main executable program in communication with the processor, the main executable program in communication with a first subroutine for color averaging, the first subroutine in communication with a color capture device, the color capture device using the first color averaging subroutine to obtain an average target color, the average target color used to find a closest match to a database of approximately 100 to 20,000 interpolated colors, the interpolated colors derived from a database of approximately 100 to 2,000 human body part and beauty product colors;

d) a set of machine readable instructions in communication with firmware located upon a custom cosmetic blending machine, the set of machine readable instructions transmitted from the first color averaging subroutine, the machine readable instructions creating custom color mixing instructions to create a color that is the closet match between the average target color and a color within the database of approximately 100 to 20,000 interpolated colors and 100 to 2,000 human body part and beauty product colors, and the custom color mixing instructions controlling a plurality of peristaltic pumps;

e) the peristaltic pumps connected to flexible tubing and canisters connected to the flexible tubing;

f) a bent needle nozzle attached to each of the peristaltic pumps such that the bent needle nozzles direct fluid to a center section of a consumer container;

g) the canisters attached to canister caps, and the canisters having strainers;

h) a sanitary elevator and tub, the tub storing cleaning fluid and the sanitary elevator raising the tub to contain the bent nozzle needles when the bent nozzle needles are not in use, the sanitary elevator including a sensor measuring the height of the tub to position the tub at a correct elevation to store the bent nozzle needles within the cleaning fluid; and i) a heater and fan attached to a thermal sensor, the heater and the fan used to keep the machine from reaching a temperature below a preset limit.

The system including a vibrator and shaker machine having a holding carriage and holding strap and the vibrator and the shaker machine moving the holding carriage in the x, y and z directions.

The system wherein skin care products include skin treatment and skin repair products comprising serum, eye cream, night cream, day cream, day lotion, night lotion, neck cream, hand cream, anti-aging cream, and moisturizer.

The system of claim 1 wherein the color capture device obtains color composition data from three or more areas of human skin.

The system further comprising a webcam, camera, scanner or optical device electronically in communication with the processor.

The system including a database of approximately 100 to 2,00 human body part colors, the database in communication with the processor and the machine readable instructions including interpolation instructions to produce approximately 100 to 20,000 additional colors.

The system including a database of approximately 100 to 22,000 human body part and beauty product colors, the database in communication with the processor and the machine readable instructions including instructions to measure a target color and then match the measured target color to the closest color in the database and then individually custom formulate and dispense the closest color in the form of a beauty product with the beauty product selected from the group comprising foundation, concealer, tinted moisturizer, skin care products, nail polish, blush, hair dye, lipstick, lip gloss, mascara, eye liner and eye shadow.

The system wherein the canisters are of a cartridge configuration, for one time use and wherein the canisters are not collapsible.

The system wherein the machine readable instructions instruct the plurality of peristaltic pumps to dispense material in a manner comprising the group of: dispensing all materials at once, dispensing materials in predefined group sequences and dispensing materials from each peristaltic pump in seriatim in a predefined sequence.

A method for producing custom color mixed beauty products based upon an individually custom created formula used to match a color selected from a database of approximately 100 to 20,000 interpolated colors and 100 to 2,000 recorded colors, the method comprising:

a) using non-transitory non-signal computer readable medium containing machine readable instructions;

b) using a processor to execute the machine readable instructions;

c) using a main executable program in communication with the processor, the main executable program in communication with a first subroutine for color averaging, the first subroutine in communication with a color capture device and the color capture device using the first subroutine to obtain an average color from a target area, the target area selected from the group comprising a human body part and a target beauty product with the target beauty product selected from the group comprising foundation, concealer, tinted moisturizer, primer and skin care products, nail polish, blush, hair dye, lipstick, lip gloss, mascara, eye liner and eye shadow.

d) using a set of machine readable instructions in communication with firmware located upon a custom cosmetic blending machine, the set of machine readable instructions transmitted from the first color analysis subroutine, the machine readable instructions creating an individual custom formulation to produce one of the colors within the database of approximately 100 to 20,000 interpolated colors and 100 to 2,000 recorded colors, the produced color being the closest match to the average target color and the custom color mixing instructions controlling a plurality of peristaltic pumps, and using the produced color to create a beauty product, the beauty product selected from the group comprising foundation, concealer, tinted moisturizer, primer, skin care products, nail polish, blush, hair dye, lipstick, lip gloss, mascara, eye liner and eye shadow;

e) using the peristaltic pumps connected to flexible tubing and canisters connected to the flexible tubing;

f) using a bent needle nozzle attached to each of the peristaltic pumps such that the bent needle nozzles direct fluid to a center section of a consumer container;

g) using the canisters attached to canister caps and using strainers within the canisters to prevent foreign material from entering the bent needle nozzles;

h) using a sanitary elevator and tub, the tub storing a cleaning fluid and the sanitary elevator raising the tub to contain the bent nozzle needles when the bent nozzle needles are not in use, the sanitary elevator including a sensor measuring the height of the tub to position the tub at a correct elevation to store the bent nozzle needles within the cleaning fluid; and i) using a heater, fan and thermal sensor to prevent the machine from reaching a temperature below a predefined limit.

The method wherein skin care products include skin treatment and skin repair products comprising serum, eye cream, night cream, day cream, day lotion, night lotion, neck cream, hand cream, anti-aging cream, and moisturizer.

The method using a computer system within the custom cosmetic blending machine, the computer system in communication with the firmware located upon the custom cosmetic blending machine.

The method using the colorimeter to obtain color composition data from three or more areas of a target area.

The method of using the colorimeter to obtain color composition data from only one area of a target area.

The method using views obtained from the colorimeter as a basis of obtaining target area texture information.

The method using webcam, camera, scanner or optical capture device or body part specimen to obtain consumer skin condition data and using the machine readable instructions to analyze the consumer skin condition data to evaluate a skin condition from the group comprising hydration, aging, skin damage, UV damage and using the machine readable instructions to custom blend skin treatment and repair essence (concentrate) products from the group comprising serum, eye cream, night cream, day cream, night lotion, day lotion, hand cream, neck cream, anti-aging cream, and moisturizer.

The method using a database of approximately 100 to 2,000 prerecorded colors, the database in communication with the processor and the machine readable instructions including interpolation instructions to produce approximately 100 to 22,000 colors within the color spectrum of the database of prerecorded colors.

The method using a database of approximately 22,000 body part colors, the database in communication with the processor and the machine readable instructions including instructions to measure a target color and then match the measured target color to the closest color in the database and then individually custom formulate and dispense the closest color.

The method using machine readable instructions to instruct the plurality of peristaltic pumps to dispense material in a manner comprising the group of: dispensing all materials at once, dispensing materials in predefined group sequences, and dispensing materials from each peristaltic pump in seriatim in a predefined sequence.

The embodiments of the invention in which an exclusive property or privilege is claimed are defined as follows:

1. A cosmetic blending machine, comprising:
  (a) a first computing device;
  (b) a first canister assembly having a first canister containing a first fluid;
  (c) a first needle nozzle configured to dispense the first fluid into a cosmetic container;
  (d) a color measuring device in communication with the first computing device, the color measuring device configured to scan and acquire a color composition of a target area of a user;
  (e) a foundation software module stored on the first computing device that is configured to, when carried out by the first computing device, calculate and formulate an average target color composition of the scanned target area and substantially match the average target color composition to a custom cosmetic product color in a second database of interpolated colors that are derived from a first database of colors; and
  (f) a device driver software module stored on the first computing device that is configured to, when carried out by the first computing device, receive the custom cosmetic product color information and send instructions to a controller to dispense the first fluid through the first needle into the cosmetic container to create a cosmetic product having the custom cosmetic product color.

2. The machine of claim 1, wherein the first database is comprised of human body part and cosmetic product colors.

3. The machine of claim 2, wherein the second database is comprised of approximately 100 to 20,000 interpolated colors and the first database is comprised of approximately 100 to 2,000 human body part and cosmetic product colors.

4. The machine of claim 1, further comprising a client file software module stored on the first computing device that is configured to, when carried out by the first computing device, receive and store information pertaining to the user.

5. The machine of claim 4, wherein the information pertaining to the user includes at least one of the average target color composition and the cosmetic product having the custom cosmetic product color.

6. The machine of claim 1, further comprising a first peristaltic pump in fluid communication with the first canister and the first needle nozzle.

7. The machine of claim 6, wherein the device driver software module stored on the first computing device is configured to, when carried out by the first computing device, receive the custom cosmetic product color information and send instructions to the controller to activate the first peristaltic pump to dispense the first fluid through the first needle nozzle.

8. The machine of claim 1, wherein the cosmetic container includes a base material and wherein the first fluid in the first canister is a color blender.

9. A cosmetic blending machine, comprising:
  (a) a first canister assembly having a first canister containing a first fluid;
  (b) a first needle nozzle configured to dispense the first fluid into a cosmetic container;
  (c) a first peristaltic pump in fluid communication with the first canister and the first needle nozzle; and
  (d) a controller configured to activate the first peristaltic pump to dispense the first fluid through the first needle nozzle into the cosmetic container to create a cosmetic product.

10. The machine of claim 9, wherein the first needle nozzle has a bent shape for directing the first fluid to a center section of the cosmetic container.

11. The machine of claim 9, wherein the first needle nozzle is tapered.

12. The machine of claim 9, wherein the first fluid in the first canister is a color blender.

13. The machine of claim 12, further comprising:
  (a) a second canister assembly having a second canister containing a second fluid selected from the group consisting of a color blender, a thinner, a moisture additive, a base material, and any combination thereof; and (b) a second needle nozzle in fluid communication with the second canister.

14. The machine of claim 9, wherein the first canister assembly further comprises a canister cap and agitator rod secured to a top of the first canister.

15. The machine of claim 9, wherein the first canister assembly further comprises a strainer disposed within an interior of the first canister.

16. The machine of claim 9, further comprising a sanitary elevator and tub, the tub storing cleaning fluid and the sanitary elevator raising the tub to contain the first needle nozzle when the first needle nozzle is not in use, the sanitary elevator including a sensor measuring the height of the tub to position the tub at a preselected elevation to store the first needle nozzle within the cleaning fluid.

17. The machine of claim 9, further comprising a heater and fan attached to a thermal sensor, the heater and the fan configured to maintain a temperature of the machine below a preset limit.

18. The machine of claim 9, further comprising a vibrator and shaker machine configured to move the cosmetic container containing the dispensed fluid in at least x, y, and z directions with at least one speed.

19. A method for blending a custom cosmetic product, comprising:
(a) providing a first computing device;
(b) providing a first canister assembly having a first canister containing a first fluid;
(c) providing a first needle nozzle configured to dispense the first fluid into a cosmetic container;
(d) using a color measuring device to scan and acquire a color composition of a target area of a user;
(e) sending, by the color measuring device, information pertaining to the scanned target area to the first computing device;
(f) running, by the first computing device, a foundation software module to calculate and formulate an average target color composition of the scanned target area and substantially match the average target color composition to a custom cosmetic product color in a second database of interpolated colors that are derived from a first database of colors;
(g) processing, by the first computing device, the custom cosmetic product color information in a device driver software module stored on the first computing device; and
(h) sending, by the first computing device, instructions to a controller to dispense the first fluid through the at least one needle into the cosmetic container to create a cosmetic product having the custom cosmetic product color.

20. The method of claim 19, wherein the first database is comprised of approximately 100 to 2,000 human body part and cosmetic product colors and the second database is comprised of approximately 100 to 20,000 interpolated colors.

21. The method of claim 19, further comprising providing a first peristaltic pump in fluid communication with the first canister and the first needle nozzle, and running the device driver software module on the first computing device to receive the custom cosmetic product color information and send instructions to the controller to activate the first peristaltic pump to dispense the first fluid through the first needle nozzle.

22. The method of claim 19, further comprising running the device driver software module on the first computing device to send instructions to the controller to pull a last drop of the first fluid back into the first peristaltic pump after the first fluid is dispensed through the first needle nozzle.

23. The method of claim 19, further comprising maintaining a temperature of the machine below a preset limit with a heater and fan attached to a thermal sensor.

24. The method of claim 19, further comprising moving the cosmetic container containing the dispensed fluid in at least x, y, and z directions with at least one speed with a vibrator and shaker machine.

* * * * *